US012720627B2

(12) United States Patent
Lopes et al.

(10) Patent No.: US 12,720,627 B2

(45) Date of Patent: Aug. 25, 2026

(54) RADIO ACCESS NETWORK SHARING USING A TRANSPARENT PROXY FUNCTION

(71) Applicant: QUALCOMM Incorporated, San Diego, CA (US)

(72) Inventors: Luis Fernando Brisson Lopes, Swindon (GB); Prasad Reddy Kadiri, San Diego, CA (US); Karl Georg Hampel, Jersey City, NJ (US); Lenaig Genevieve Chaponniere, La Jolla, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 18/317,883

(22) Filed: May 15, 2023

(65) Prior Publication Data

US 2024/0389176 A1 Nov. 21, 2024

(51) Int. Cl.

*H04W 76/15* (2018.01)
*H04W 8/14* (2009.01)
*H04W 92/16* (2009.01)

(52) U.S. Cl.

CPC ............. *H04W 76/15* (2018.02); *H04W 8/14* (2013.01); *H04W 92/16* (2013.01)

(58) Field of Classification Search

CPC .................................................... H04W 76/40

See application file for complete search history.

(56) References Cited

U.S. PATENT DOCUMENTS

2014/0064246 A1 3/2014 Baillargeon
2018/0227873 A1 8/2018 Vrzic et al.

(Continued)

FOREIGN PATENT DOCUMENTS

CN 110771221 A 2/2020
CN 114205881 A 3/2022

(Continued)

OTHER PUBLICATIONS

3GPP TR 23.737: "3rd Generation Partnership Project, Technical Specification Group Services and System Aspects, Study on Architecture Aspects for Using Satellite Access in 5G (Release 17)", 3GPP Standard, Technical Report, 3rd Generation Partnership Project, Mobile Competence Centre, 650, Route Des Lucioles, F-06921 Sophia-Antipolis Cedex, France, vol. SA WG2, No. V17.0.0, Dec. 22, 2019, pp. 1-82, XP051840937, section 6.8, p. 37-p. 39.

(Continued)

*Primary Examiner* — Pamit Kaur

(74) *Attorney, Agent, or Firm* — Holland & Hart LLP

(57) ABSTRACT

Methods, systems, and devices for wireless communications are described. An access and mobility management function (AMF) proxy may establish a first communication link between the AMF proxy and a first radio access network (RAN) associated with a first network operator, a second communication link between the AMF proxy and a first AMF associated with the first network operator, and a third communication link between the AMF proxy and a second AMF associated with a second network operator. The AMF proxy may the receive a message from the first RAN that includes a source identifier (ID) associated with a network entity of the first RAN and a target AMF ID. Following, the AMF proxy may transmit the message to the first AMF or transmit the message to the second AMF, based on the target (Continued)

AMF ID corresponding to the first AMF or the target AMF ID corresponding to the second AMF.

30 Claims, 24 Drawing Sheets

(56) References Cited

U.S. PATENT DOCUMENTS

| | | | | |
|---|---|---|---|---|
| 2020/0045753 | A1 | 2/2020 | Dao et al. | |
| 2020/0228619 | A1 | 7/2020 | Zhang | |
| 2020/0245284 | A1 | 7/2020 | Hans | |
| 2021/0014742 | A1* | 1/2021 | Wang | H04W 36/0027 |
| 2022/0095150 | A1 | 3/2022 | Goel | |
| 2023/0319906 | A1 | 10/2023 | Natarajan et al. | |
| 2024/0121610 | A1 | 4/2024 | Rajadurai et al. | |
| 2024/0340630 | A1 | 10/2024 | Srivastava et al. | |
| 2024/0349179 | A1 | 10/2024 | Starsinic et al. | |
| 2024/0389048 | A1 | 11/2024 | Lopes et al. | |
| 2024/0389177 | A1 | 11/2024 | Lopes et al. | |
| 2026/0025873 | A1 | 1/2026 | Lopes | |

FOREIGN PATENT DOCUMENTS

| | | | | |
|---|---|---|---|---|
| WO | WO-2023273767 | A1 * | 1/2023 | H04W 76/19 |
| WO | WO-2023061575 | A1 | 4/2023 | |
| WO | WO-2023061577 | A1 | 4/2023 | |
| WO | WO-2024162185 | A1 | 8/2024 | |

OTHER PUBLICATIONS

Huawei, et al., "Update of Solution#22 with the Standalone NPN Architecture", SA WG2 Meeting #129bis, S2-1812356 (Revision of S2-18xxxx), 3rd Generation Partnership Project, Mobile Competence Centre, 650, Route Des Lucioles, F-06921 Sophia-Antipolis Cedex, France, vol. SA WG2, West Palm Beach, Florida, The US, Nov. 26, 2018-Nov. 30, 2018, Nov. 20, 2018, pp. 1-10, XP051563869, section 6.22.2.2.1, p. 5-p. 7, figures 6.22.2.2.1-1 section 6.22.3, p. 7-p. 10, figures 6.22.3.1-1, 6.22.3.1-2.

Ericsson: "AMF Reallocation", 3GPP TSG-SA WG2 Meeting #136, S2-1912145, S2-1911106, (Revision of S2-1909357), 3rd Generation Partnership Project, Mobile Competence Centre, 650, Route Des Lucioles, F-06921 Sophia-Antipolis Cedex, France, vol. SA WG2, No. Reno, Nevada, US, Oct. 14, 2019-Oct. 18, 2019, Nov. 22, 2019, 8 Pages, XP051828258, The whole document.

International Search Report and Written Opinion—PCT/US2024/023623—ISA/EPO—Jul. 11, 2024 (2303776U1WO).

* cited by examiner 505 510 515 520

RAN

AMF Proxy

First AMF

Second AMF

Establish First Communication Link

Establish Second Communication Link 525-a 525-b

Establish Third Communication Link 525-c

530

Message for the First AMF or Second AMF

535

Message for the First AMF or Second AMF

Decoding the message

Decoding the message 540-a 540-b

Message for the RAN

545

Message for the RAN

550

Establish a first communication link between the AMF proxy and a first radio access network associated with a first network operator, a second communication link between the AMF proxy and a first AMF associated with the first network operator, and a third communication link between the AMF proxy and a second AMF associated with a second network operator

1805

Receive, from the first radio access network via the first communication link, a message including a source identifier associated with a network entity of the first radio access network and including a target AMF identifier

1810

Transmit the message to the first AMF via the second communication link based on the target AMF identifier corresponding to the first AMF or transmitting the message to the second AMF via the third communication link based on the target AMF identifier corresponding to the second AMF

1815

1800

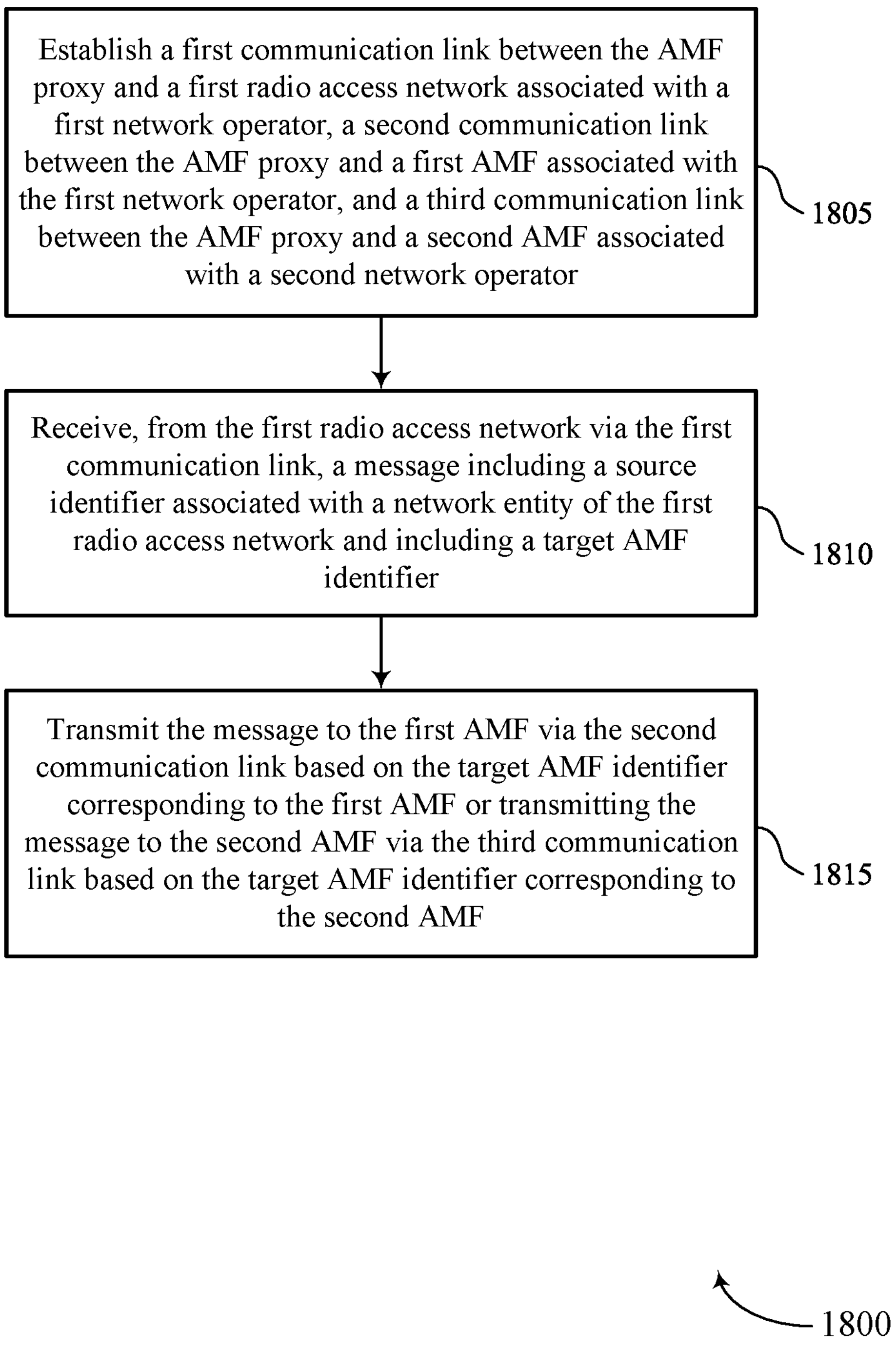

FIG. 18

Transmit, as part of establishing a first communication link between a first radio access network associated with a first network operator and a first AMF associated with the first network operator, a first message to the first radio access network, the message indicating support for establishing a communication link with an AMF of a network operator that is different than the first network operator

2005

Establish a second communication link between the first AMF and a second AMF associated with a second network operator based on the first AMF acting as the AMF proxy and on the first message

2010

Receive, from the first radio access network via the first communication link, a message including a source identifier associated with a network entity of the first radio access network and including a target AMF identifier

2015

Transmit a second message to the second AMF via the second communication link based on the target AMF identifier corresponding to the second AMF

2020

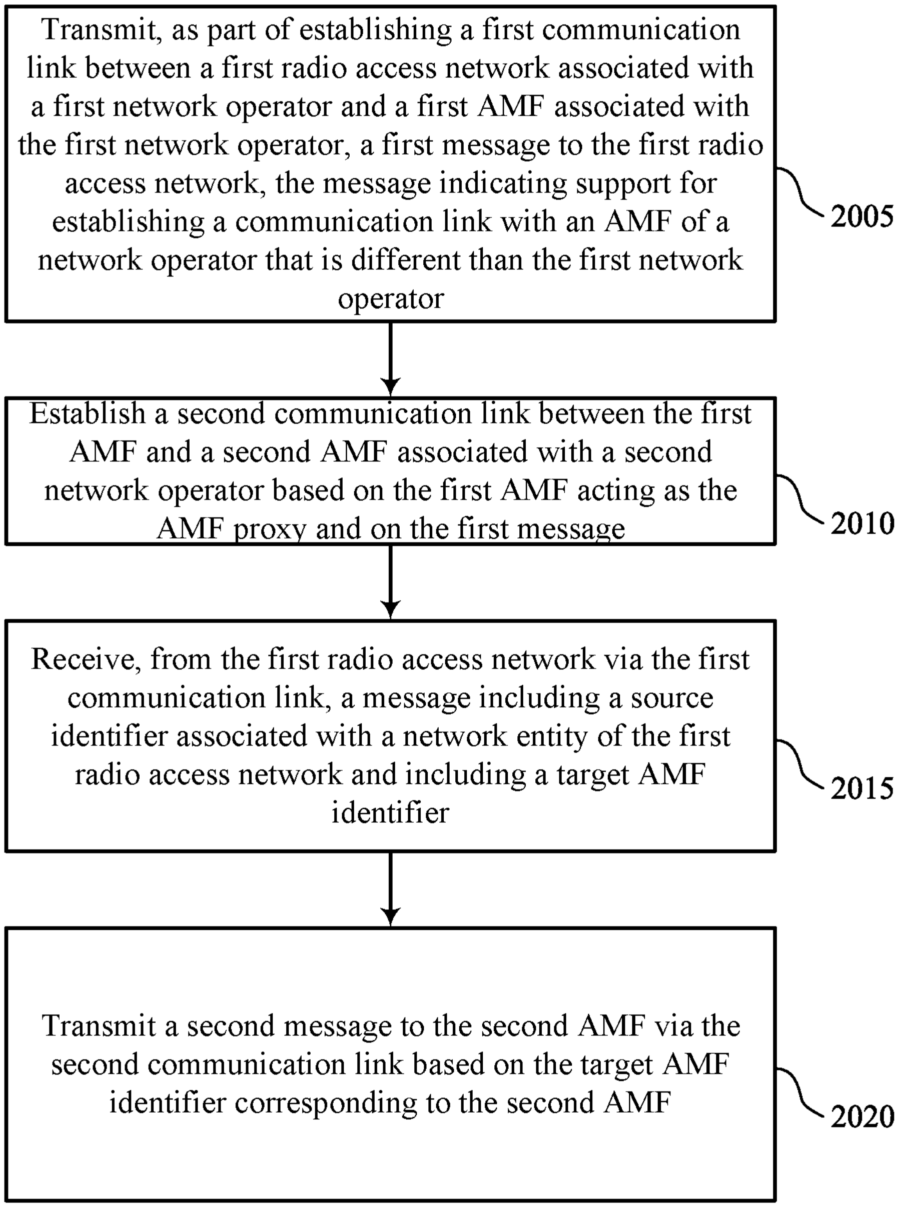

Establish a communication link between an access and mobility management function (AMF) proxy and the first radio access network associated with a first network operator for communications with a first AMF associated with the first network operator or for communications with a second AMF associated with a second network operator

2205

Transmit, to the AMF proxy via the communication link, a message including a source identifier associated with a network entity of the first radio access network and including a target AMF identifier, where the message is for the first AMF or the second AMF based on the target AMF identifier

2210

2200

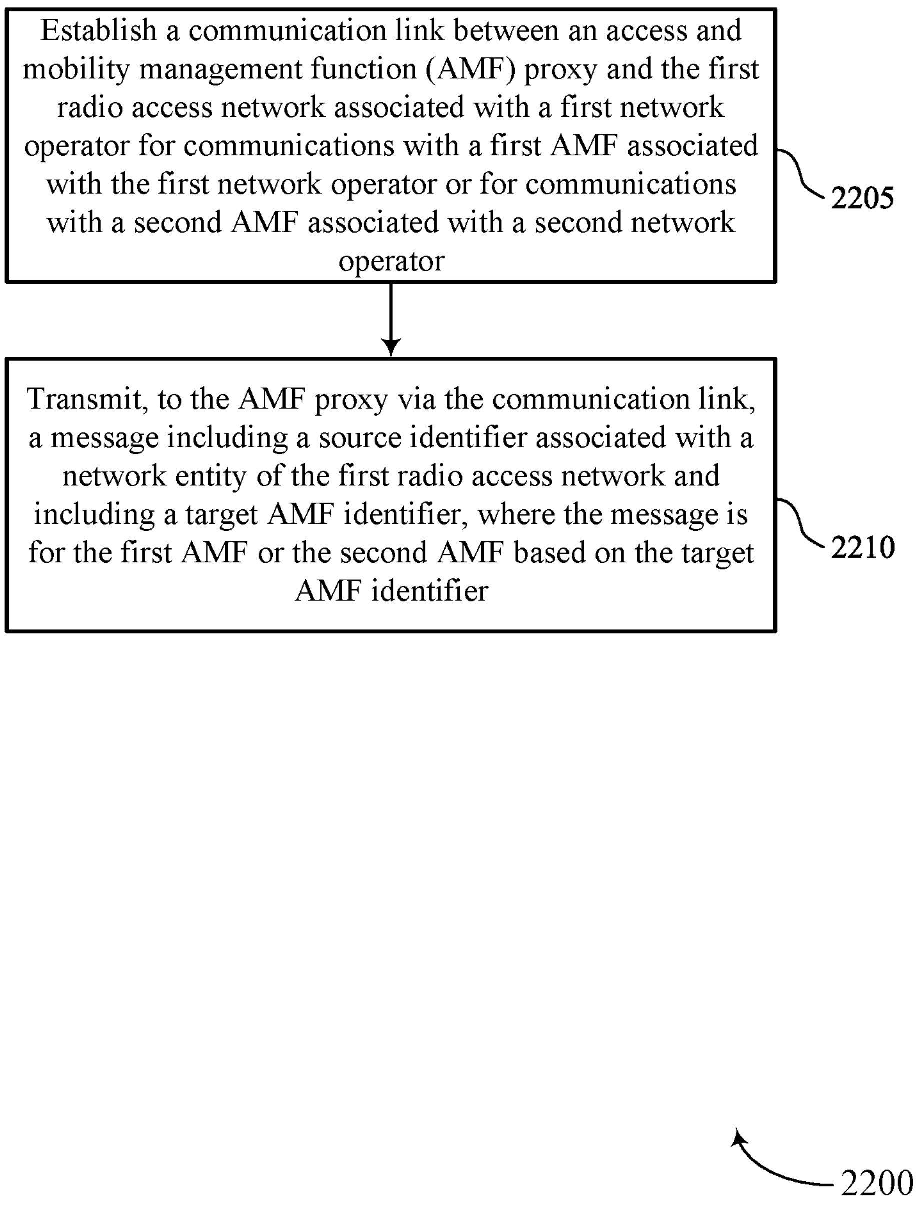

FIG. 22

RADIO ACCESS NETWORK SHARING USING A TRANSPARENT PROXY FUNCTION

FIELD OF TECHNOLOGY

The following relates to wireless communications, including radio access network (RAN) sharing using a transparent proxy function.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support radio access network (RAN) sharing using a transparent proxy function. For example, the described techniques provide for an access and mobility management function (AMF) proxy establishing a first communication link between the AMF proxy and a first RAN associated with a first network operator, a second communication link between the AMF proxy and a first AMF associated with the first network operator, and a third communication link between the AMF proxy and a second AMF associated with a second network operator. The AMF proxy may receive a message from the first RAN via the first communication link where the message may include a source identifier (ID) associated with a network entity of the first RAN and a target AMF ID. The AMF proxy may transmit the message to the first AMF via the second communication link based on the target AMF ID being associated with the first AMF, or the AMF proxy may transmit the message to the second AMF via the third communication link based on the target AMF ID being associated with the second AMF.

A method for wireless communications at an AMF proxy is described. The method may include establishing a first communication link between the AMF proxy and a first RAN associated with a first network operator, a second communication link between the AMF proxy and a first AMF associated with the first network operator, and a third communication link between the AMF proxy and a second AMF associated with a second network operator, receiving, from the first RAN via the first communication link, a message including a source ID associated with a network entity of the first RAN and including a target AMF ID, and transmitting the message to the first AMF via the second communication link based on the target AMF ID corresponding to the first AMF or transmitting the message to the second AMF via the third communication link based on the target AMF ID corresponding to the second AMF.

An apparatus for wireless communications at an AMF proxy is described. The apparatus may include a processor, memory coupled with the processor, and instructions stored in the memory. The instructions may be executable by the processor to cause the apparatus to establish a first communication link between the AMF proxy and a first RAN associated with a first network operator, a second communication link between the AMF proxy and a first AMF associated with the first network operator, and a third communication link between the AMF proxy and a second AMF associated with a second network operator, receive, from the first RAN via the first communication link, a message including a source ID associated with a network entity of the first RAN and including a target AMF ID, and transmit the message to the first AMF via the second communication link based on the target AMF ID corresponding to the first AMF or transmitting the message to the second AMF via the third communication link based on the target AMF ID corresponding to the second AMF.

Another apparatus for wireless communications at an AMF proxy is described. The apparatus may include means for establishing a first communication link between the AMF proxy and a first RAN associated with a first network operator, a second communication link between the AMF proxy and a first AMF associated with the first network operator, and a third communication link between the AMF proxy and a second AMF associated with a second network operator, means for receiving, from the first RAN via the first communication link, a message including a source ID associated with a network entity of the first RAN and including a target AMF ID, and means for transmitting the message to the first AMF via the second communication link based on the target AMF ID corresponding to the first AMF or transmitting the message to the second AMF via the third communication link based on the target AMF ID corresponding to the second AMF.

A non-transitory computer-readable medium storing code for wireless communications at an AMF proxy is described. The code may include instructions executable by a processor to establish a first communication link between the AMF proxy and a first RAN associated with a first network operator, a second communication link between the AMF proxy and a first AMF associated with the first network operator, and a third communication link between the AMF proxy and a second AMF associated with a second network operator, receive, from the first RAN via the first communication link, a message including a source ID associated with a network entity of the first RAN and including a target AMF ID, and transmit the message to the first AMF via the second communication link based on the target AMF ID corresponding to the first AMF or transmitting the message to the second AMF via the third communication link based on the target AMF ID corresponding to the second AMF.

In some examples of the method, apparatuses, and non-transitory computer-readable medium described herein, the first communication link may be established directly between the first RAN and the first AMF and the method, apparatuses, and non-transitory computer-readable medium may include further operations, features, means, or instructions for establishing the second communication link between the first AMF associated with the first network operator and the second AMF associated with the second network operator, where the first AMF acts as the AMF proxy.

Some examples of the method, apparatuses, and non-transitory computer-readable medium described herein may further include operations, features, means, or instructions for transmitting, as part of establishing the first communication link between the first RAN and the first AMF, a second message to the first RAN, the second message indicating support for establishing a communication link with an AMF of a network operator that may be different than the first network operator and establishing the second communication link between the first AMF and the second AMF based on the first AMF acting as the AMF proxy and on the second message.

Some examples of the method, apparatuses, and non-transitory computer-readable medium described herein may further include operations, features, means, or instructions for establishing a set of multiple communication links between the AMF proxy and a set of multiple RANs, where the set of multiple communication links includes the first communication link and the set of multiple RANs includes the first RAN.

Some examples of the method, apparatuses, and non-transitory computer-readable medium described herein may further include operations, features, means, or instructions for receiving, from the set of multiple RANs via the set of multiple communication links between the AMF proxy and the set of multiple RANs, a set of multiple messages, each message of the set of multiple messages including a respective source ID associated with a respective network entity of a respective RAN of the set of multiple RANs and a respective target AMF ID associated with one of the first AMF or the second AMF, multiplexing one or more messages that may have a same target ID together, the one or more messages being from the set of multiple messages, where the one or more messages with the same target ID associated with the first AMF may be multiplexed together in a first multiplexed message and the one or more messages with the same target ID associated with the second AMF may be multiplexed together into a second multiplexed message, and transmitting the first and second multiplexed messages to respective AMFs of the first AMF and the second AMF.

In some examples of the method, apparatuses, and non-transitory computer-readable medium described herein, receiving the message from the first RAN via the first communication link may include operations, features, means, or instructions for receiving the message including the source ID and the target AMF ID as part of a routing information element in the message.

In some examples of the method, apparatuses, and non-transitory computer-readable medium described herein, the target AMF ID includes a public land mobile network (PLMN) ID.

Some examples of the method, apparatuses, and non-transitory computer-readable medium described herein may further include operations, features, means, or instructions for receiving a first message from the first RAN via the first communication link, the first message including the source ID and the target AMF ID, the target AMF ID including a corresponding PLMN ID, storing an index of the target AMF ID and the corresponding PLMN ID and associating the target AMF ID with an index value, transmitting the index value to the first RAN, and receiving a second message from the first RAN via the first communication link, the second message including the source ID, the index value for the target AMF ID, and the corresponding PLMN ID.

Some examples of the method, apparatuses, and non-transitory computer-readable medium described herein may further include operations, features, means, or instructions for receiving a second message from the first AMF via the second communication link or from the second AMF via the third communication link, the second message including a source AMF ID and a target RAN ID and transmitting a second message to the first RAN via the first communication link based on the target RAN ID.

In some examples of the method, apparatuses, and non-transitory computer-readable medium described herein, receiving the second message from the first AMF via second communication link or from the second AMF via the third communication link may include operations, features, means, or instructions for receive the second message including the source AMF ID and the target RAN ID as part of a routing information element in the second message.

A method for wireless communications at a first RAN is described. The method may include establishing a communication link between an AMF proxy and the first RAN associated with a first network operator for communications with a first AMF associated with the first network operator or for communications with a second AMF associated with a second network operator and transmitting, to the AMF proxy via the communication link, a message including a source ID associated with a network entity of the first RAN and including a target AMF ID, where the message is for the first AMF or the second AMF based on the target AMF ID.

An apparatus for wireless communications at a first RAN is described. The apparatus may include a processor, memory coupled with the processor, and instructions stored in the memory. The instructions may be executable by the processor to cause the apparatus to establish a communication link between an AMF proxy and the first RAN associated with a first network operator for communications with a first AMF associated with the first network operator or for communications with a second AMF associated with a second network operator and transmit, to the AMF proxy via the communication link, a message including a source ID associated with a network entity of the first RAN and including a target AMF ID, where the message is for the first AMF or the second AMF based on the target AMF ID.

Another apparatus for wireless communications at a first RAN is described. The apparatus may include means for establishing a communication link between an AMF proxy and the first RAN associated with a first network operator for communications with a first AMF associated with the first network operator or for communications with a second AMF associated with a second network operator and means for transmitting, to the AMF proxy via the communication link, a message including a source ID associated with a network entity of the first RAN and including a target AMF ID, where the message is for the first AMF or the second AMF based on the target AMF ID.

A non-transitory computer-readable medium storing code for wireless communications at a first RAN is described. The code may include instructions executable by a processor to establish a communication link between an AMF proxy and the first RAN associated with a first network operator for communications with a first AMF associated with the first network operator or for communications with a second AMF associated with a second network operator and transmit, to the AMF proxy via the communication link, a message including a source ID associated with a network entity of the first RAN and including a target AMF ID, where the message is for the first AMF or the second AMF based on the target AMF ID.

In some examples of the method, apparatuses, and non-transitory computer-readable medium described herein, the communication link may be established directly between the first RAN and the first AMF and the method, apparatuses, and non-transitory computer-readable medium may include further operations, features, means, or instructions for transmitting the message, to the first AMF via the communication link, based on the first AMF acting as the AMF proxy.

In some examples of the method, apparatuses, and non-transitory computer-readable medium described herein, the first RAN may be included in a set of multiple RANs and the communication link may be included in a set of multiple communication links between the set of multiple RANs and the AMF proxy.

In some examples of the method, apparatuses, and non-transitory computer-readable medium described herein, transmitting the message to the AMF proxy via the communication link may include operations, features, means, or instructions for transmitting the message including the source ID and the target AMF ID as part of a routing information element in the message.

In some examples of the method, apparatuses, and non-transitory computer-readable medium described herein, the target AMF ID includes a PLMN ID.

Some examples of the method, apparatuses, and non-transitory computer-readable medium described herein may further include operations, features, means, or instructions for transmitting a second message to the AMF proxy via the communication link, the second message including the source ID and the target AMF ID including a corresponding PLMN ID, receiving, from the AMF proxy, an index value for the target AMF ID based on the target AMF ID and the corresponding PLMN ID, and transmitting a third message to the AMF proxy via the communication link, the second message including the source ID, the index value for the target AMF ID, and the corresponding PLMN ID.

Some examples of the method, apparatuses, and non-transitory computer-readable medium described herein may further include operations, features, means, or instructions for receiving a second message from the AMF proxy via the communication link, the second message including a source AMF ID and a target RAN ID, where the source AMF ID may be associated with the first AMF or the second AMF and the target RAN ID may be associated with the first RAN.

In some examples of the method, apparatuses, and non-transitory computer-readable medium described herein, receiving the second message from the AMF proxy via the communication link may include operations, features, means, or instructions for receive the second message including the source ID and the target AMF ID as part of a routing information element in the second message.

A method for wireless communications at an AMF is described. The method may include establishing a communication link between an AMF proxy and the AMF, receiving, from the AMF proxy via the communication link, a message including a source ID associated with a network entity of a first RAN associated with a first network operator and including a target AMF ID associated with the AMF, and decoding the message from the AMF proxy based on the target AMF ID being associated with the AMF.

An apparatus for wireless communications at an AMF is described. The apparatus may include a processor, memory coupled with the processor, and instructions stored in the memory. The instructions may be executable by the processor to cause the apparatus to establish a communication link between an AMF proxy and the AMF, receive, from the AMF proxy via the communication link, a message including a source ID associated with a network entity of a first RAN associated with a first network operator and including a target AMF ID associated with the AMF, and decode the message from the AMF proxy based on the target AMF ID being associated with the AMF.

Another apparatus for wireless communications at an AMF is described. The apparatus may include means for establishing a communication link between AMF proxy and the AMF, means for receiving, from the AMF proxy via the communication link, a message including a source ID associated with a network entity of a first RAN associated with a first network operator and including a target AMF ID associated with the AMF, and means for decoding the message from the AMF proxy based on the target AMF ID being associated with the AMF.

A non-transitory computer-readable medium storing code for wireless communications at an AMF is described. The code may include instructions executable by a processor to establish a communication link between an AMF proxy and the AMF, receive, from the AMF proxy via the communication link, a message including a source ID associated with a network entity of a first RAN associated with a first network operator and including a target AMF ID associated with the AMF, and decode the message from the AMF proxy based on the target AMF ID being associated with the AMF.

In some examples of the method, apparatuses, and non-transitory computer-readable medium described herein, the AMF may be associated with the first network operator or a second network operator.

In some examples of the method, apparatuses, and non-transitory computer-readable medium described herein, the AMF being associated with the first network operator and a first communication link being established directly between the first RAN and the AMF and the method, apparatuses, and non-transitory computer-readable medium may include further operations, features, means, or instructions for establishing a second communication link between the AMF and a different AMF associated with the second network operator based on the AMF acting as the AMF proxy and receiving the message from the network entity of the first RAN associated with the first network operator including the source ID and the target AMF ID.

Some examples of the method, apparatuses, and non-transitory computer-readable medium described herein may further include operations, features, means, or instructions for refraining from decoding the message from the network entity of the first RAN and transmitting the message from the network entity of the first RAN to the different AMF associated with the second network operator based on the target AMF ID of the message being associated with the different AMF associated with the second network operator.

Some examples of the method, apparatuses, and non-transitory computer-readable medium described herein may further include operations, features, means, or instructions for receiving a multiplexed message from the AMF proxy, where the multiplexed message includes one or messages that may have a same target AMF ID and decoding the one or more messages received via the multiplexed message.

In some examples of the method, apparatuses, and non-transitory computer-readable medium described herein, receiving the message from the network entity of the first RAN may include operations, features, means, or instructions for receiving the message including the source ID and the target AMF ID as part of a routing information element in the message.

In some examples of the method, apparatuses, and non-transitory computer-readable medium described herein, the target AMF ID includes a PLMN ID.

Some examples of the method, apparatuses, and non-transitory computer-readable medium described herein may further include operations, features, means, or instructions for transmitting a second message to the AMF proxy via the communication link, the second message including the source AMF ID and a target RAN ID, where the source AMF ID may be associated with the AMF and the target RAN ID may be associated with the first RAN.

In some examples of the method, apparatuses, and non-transitory computer-readable medium described herein, transmitting the second message to the first RAN may include operations, features, means, or instructions for transmitting the second message including the source AMF ID and the target RAN ID as part of a routing information element in the message.

BRIEF DESCRIPTION OF THE DRAWINGS

FIGS. 18 through 24 show flowcharts illustrating methods that support RAN sharing using a transparent proxy function in accordance with one or more aspects of the present disclosure.

DETAILED DESCRIPTION

Figure 1:
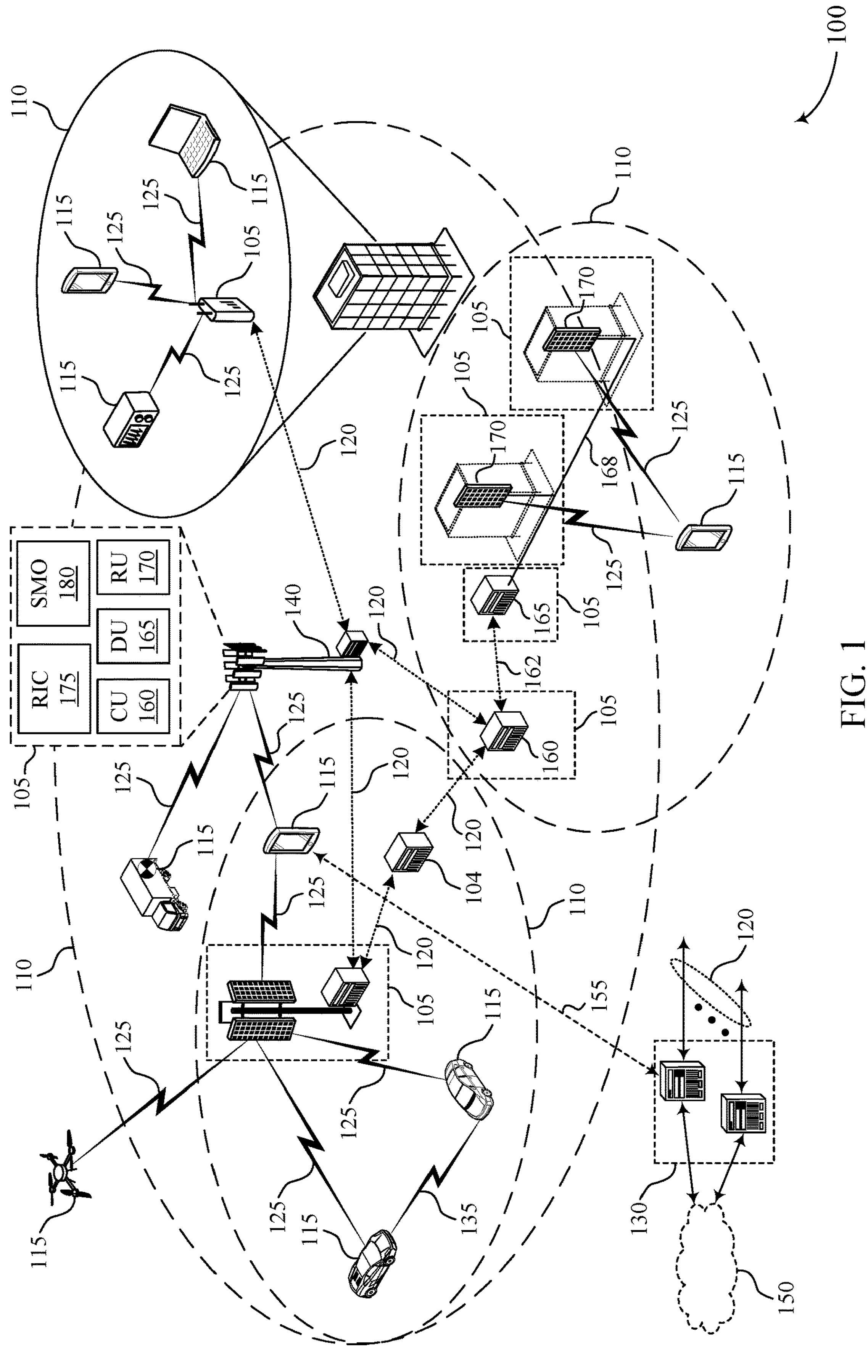
FIG. 1 shows an example of a wireless communications system that supports radio access network (RAN) sharing using a transparent proxy function in accordance with one or more aspects of the present disclosure.

In some wireless communication systems, devices (e.g., user equipments (UEs), network entities, core networks nodes) may belong to a network operator. Some network operators may deploy network entities (e.g., base stations) and core network nodes (e.g., access and mobility management functions (AMFs)) to serve UEs. For example, a first network operator may deploy network entities to setup a radio access network (RAN) that supports wireless communications for the first network operator UEs (e.g., UEs subscribed to or operated by the first network operator). A RAN may include one or more components, such as base station or network entities, that support communications for one or more wireless devices, such as UEs. In some cases, the first network operator may share the first network operator deployment (e.g., its RAN) with a second network operator so that the second network operator may refrain from setting up or placing network entities to support a RAN that supports wireless communication for the second network operator UEs. In doing so, the second network operator may instead use the RAN deployed by the first network operator to support communications for the second network operator UEs within the RAN.

Traditionally, to support network sharing in this manner, the RAN may independently connect with an AMF of the first network operator and an AMF of the second network operator and may forward messages to a respective AMF depending on the network operator of the UE that sent the message to the RAN. The second network operator, however, may not want to place local AMFs to connect to the RAN deployed by the first network operator (e.g., due to cost constraints, hardware constraints, or both). As such, without any local second network operator AMFs, the RAN (deployed by first network operator) may be unable to be shared with the second network operator and may therefore be unable to forward messages from the second network operator UEs to the second network operator core network.

According to aspects herein, the first network operator and the second network operator may use an AMF proxy function to provide connectivity between the RAN of the first network operator and a remote AMF of the second network operator. In some cases, the AMF proxy function may be referred to as a transparent proxy. When being utilized as a transparent proxy the AMF proxy may allow the first network operator to share the deployment of the first network operator RAN with the second network operator, while the second network operator refrains from placing any local AMFs. As such, the RAN of the first network operator may connect directly with the AMF proxy and establish a communication link between the RAN and the AMF proxy. Then the AMF proxy may connect and establish communication links with the AMF of the first network operator and the AMF of the second network operator instead of the RAN establishing such communication link.

As the RAN may not be directly connected with the AMFs of the first network operator and the second network operator, when transmitting messages the RAN may include a target identifier (ID) in the messages to the AMF proxy indicating which AMF the message may be for (e.g., which operator the message is for). In doing so, the AMF proxy may forward the message to the correct AMF based on the target ID while refraining from processing or decoding the contents of the message. Additionally, or alternatively, the message from the RAN may include a source ID which may assist an AMF in decoding the message from the AMF proxy in cases where there may be multiple RANs connected to the AMF proxy. As such, using the AMF proxy function may result in a decrease in latency and signaling overhead as the RAN may have fewer connections to manage and the techniques of the present disclosure may also increase the efficiency of communications.

Aspects of the disclosure are initially described in the context of wireless communications systems. Additional aspects of the disclosure are described herein with reference to a wireless communications system, a network architecture diagram, and a process flow. Aspects of the disclosure are further illustrated by and described with reference to apparatus diagrams, system diagrams, and flowcharts that relate to RAN sharing using a transparent proxy function.

FIG. 1 shows an example of a wireless communications system 100 that supports RAN sharing using a transparent proxy function in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a RAN (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support RAN sharing using a transparent proxy function as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $TS=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an ID for distinguishing neighboring cells (e.g., a physical cell ID (PCID), a virtual cell ID (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communications system 100, wireless devices (e.g., UEs 115 network entities 105, core networks 130 nodes) may belong to a network operator. Some network operators may deploy network entities 105 (e.g., base stations 140) and core network 130 nodes (e.g., AMFs) to serve UEs 115. For example, a first network operator may deploy network entities to setup a RAN that supports wireless communications for the first network operator UEs 115 (e.g., UEs 115 subscribed to or operated by the first network operator). In some cases, the first network operator may share the first network operator deployment (e.g., its RAN) with a second network operator so that the second network operator may refrain from setting up or placing network entities 105 to support a RAN that supports wireless communication for the second network operator UEs 115. In doing so, the second network operator may instead use the RAN deployed by the first network operator to support communications for the second network operator UEs 115 within the RAN.

Traditionally, to support network sharing in this manner, the RAN may independently connect with an AMF for the first network operator and an AMF for the second network operator and may forward messages to a respective AMF depending on the network operator of the UE 115 that sent the message to the RAN. The second network operator, however, may not want to place local AMFs to connect to the RAN deployed by the first network operator (e.g., due to cost constraints, hardware constraints, or both). As such, without any local second network operator AMFs, the RAN (deployed by first network operator) may be unable to be shared with the second network operator and may therefore be unable to forward messages from the second network operator UEs to the second network operator core network.

Therefore, the first network operator and the second network operator may use an AMF proxy function to provide connectivity between the RAN of the first network operator and a remote AMF of the second network operator. In some cases, the AMF proxy function may be referred to as a transparent proxy. When being utilized as a transparent proxy the AMF proxy may allow the first network operator to share the deployment of the first network operator RAN with the second network operator, while the second network operator refrains from placing any local AMFs. As such, the RAN of the first network operator may connect directly with the AMF proxy and establish a communication link between the RAN and the AMF proxy. Then the AMF proxy may connect and establish communication links with the AMF of the first network operator and the AMF of the second network operator instead of the RAN establishing such communication link.

As the RAN may not be directly connected with the AMFs of the first network operator and the second network operator, when transmitting messages the RAN may include a target ID in the messages to the AMF proxy indicating which AMF the message may be for (e.g., which operator the message is for). In doing so, the AMF proxy may forward the message to the correct AMF based on the target ID while refraining from processing or decoding the contents of the message. Additionally, or alternatively, the message from the RAN may include a source ID which may assist an AMF in decoding the message from the AMF proxy in cases where there may be multiple RANs connected to the AMF proxy. As such, using the AMF proxy function may result in a decrease in latency and signaling overhead as the RAN may have fewer connections to manage and the techniques of the present disclosure may also increase the efficiency of communications.

Figure 2:
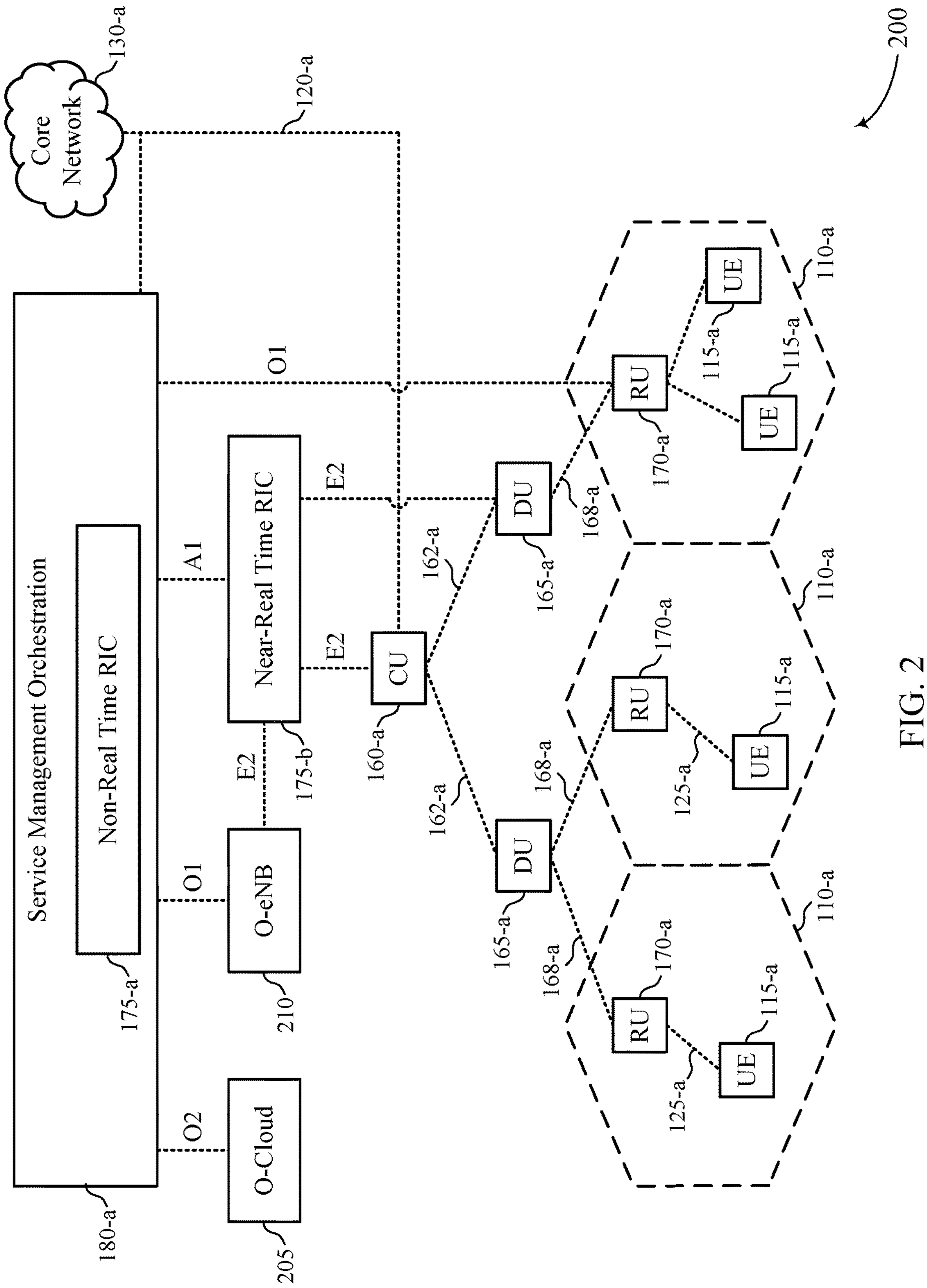
FIG. 2 shows an example of a network architecture that supports RAN sharing using a transparent proxy function in accordance with one or more aspects of the present disclosure.

FIG. 2 shows an example of a network architecture 200 (e.g., a disaggregated base station architecture, a disaggregated RAN architecture) that supports RAN sharing using a transparent proxy function in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ A1 or ML models to perform corrective actions through the SMO 180-*a* (e.g., reconfiguration via O1) or via generation of RAN management policies (e.g., A1 policies).

In some examples, network entities 105 may use an AMF proxy function to provide connectivity between a RAN of a first network operator and a remote AMF of a second network operator. In some cases, the AMF proxy function may be referred to as a transparent proxy. When being utilized as a transparent proxy the AMF proxy may allow the first network operator to share the deployment of the first network operator RAN with the second network operator, while the second network operator refrains from placing any local AMFs. As such, the RAN of the first network operator may connect directly with the AMF proxy and establish a communication link between the RAN and the AMF proxy. Then the AMF proxy may connect and establish communication links with the AMF of the first network operator and the AMF of the second network operator instead of the RAN establishing such communication link.

As the RAN may not be directly connected with the AMFs of the first network operator and the second network operator, when transmitting messages the RAN may include a target ID in the messages to the AMF proxy indicating which AMF the message may be for (e.g., which operator the message is for). In doing so, the AMF proxy may forward the message to the correct AMF based on the target ID while refraining from processing or decoding the contents of the message. Additionally, or alternatively the message from the RAN may include a source ID which may assist an AMF in decoding the message from the AMF proxy in cases where there may be multiple RANs connected to the AMF proxy. As such, using the AMF proxy function may result in a decrease in latency and signaling overhead as the RAN may have fewer connections to manage and the techniques of the present disclosure may also increase the efficiency of communications. Further, when using such RAN sharing via the AMF proxy, the network architecture 200 may support one or more CUs 160-*a* to communicate with core networks 130 of different network operators (e.g., the first network operator and the second network operator). Additional descriptions of such techniques using the AMF proxy may be described with reference to FIGS. 3-5.

Figure 3:
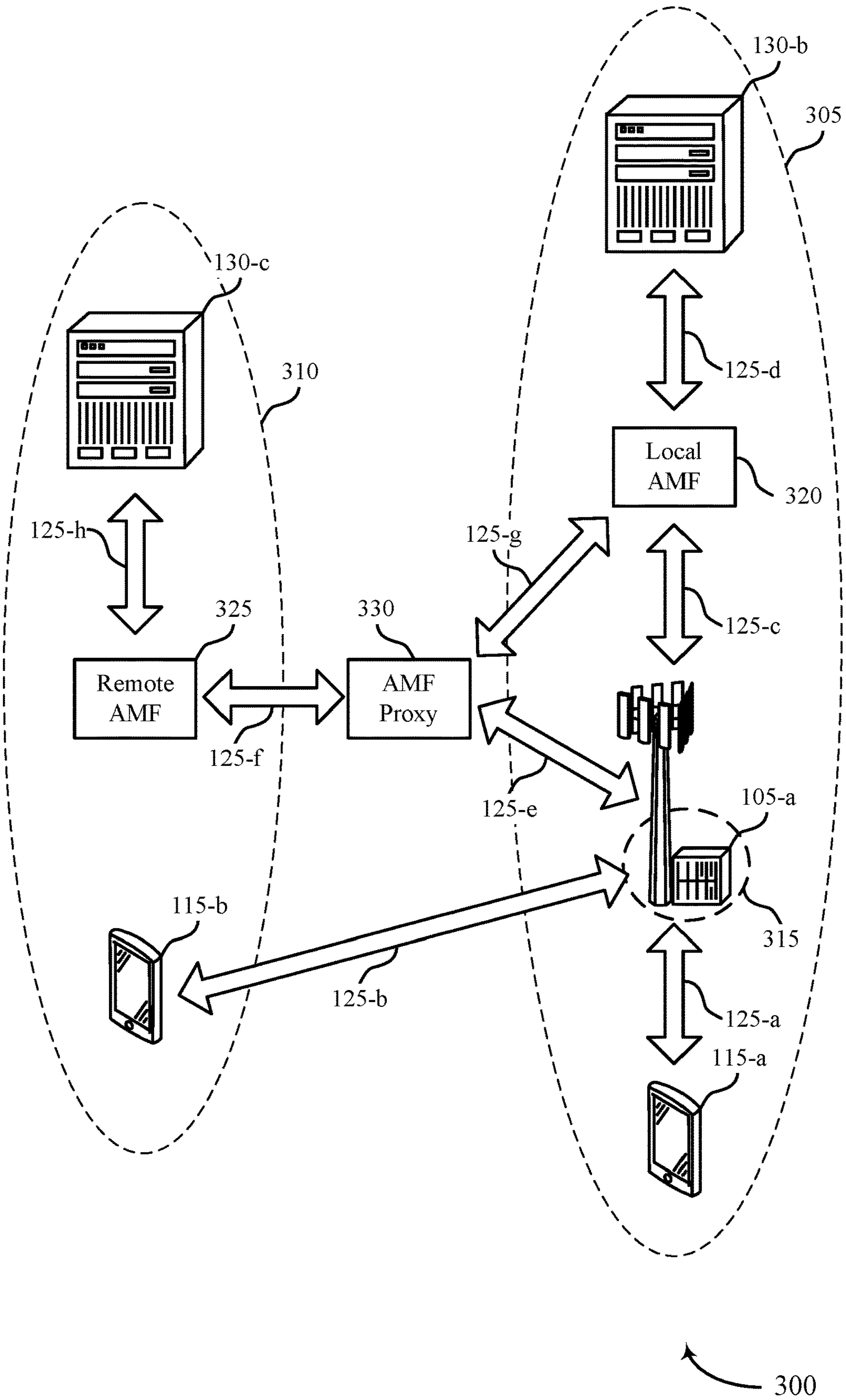
FIG. 3 shows an example of a wireless communications system that supports RAN sharing using a transparent proxy function in accordance with one or more aspects of the present disclosure.

FIG. 3 shows an example of a wireless communications system 300 that supports RAN sharing using a transparent proxy function in accordance with one or more aspects of the present disclosure. In some examples, the wireless communications system 300 may implement or be implemented by the wireless communications system 100 or the network architecture 200. For example, the wireless communications system 300 may include a UE 115-*a*, a UE 115-*b*, a network entity 105-*a*, a core network 130-*b*, and a core network 130-*c*, which may be examples of corresponding devices described herein with reference to FIGS. 1 and 2. The UE 115-*a*, the UE 115-*b*, the network entity 105-*a*, the core network 130-*b*, and the core network 130-*c* may communicate via communication links 125 (e.g., a communication link 125-*a*, a communication link 125-*b*, a communication link 125-*c*, a communication link 125-*d*, a communication link 125-*e*, a communication link 125-*f*, a communication link 125-*g*, and a communication link 125-*h*), which may be examples of a communication link described herein with reference to FIG. 1. The communication links 125 may be examples of a Uu link, a sidelink, a backhaul link, a D2D link or some other type of communication link 125.

In the wireless communications system 300, wireless devices may be subscribed to or serviced by a network operator. A network operator may be an operator or service provider that may provide cellular or wireless services (e.g., communication of data) to wireless devices (e.g., UEs 115, network entities 105). For example, the UE 115-*a*, the network entity 105-*a*, and the core network 130-*b* may be operated by (e.g., configured for operations with) a first network operator 305, while the UE 115-*b* and core network 130-*c* may be operated by (e.g., configured for operations with) a second network operator 310. Further, a network operator may establish one or more RANs to provide support for UEs 115 subscribed to or operated by a given network operator. For example, the first network operator 305 may establish a RAN 315 that includes the network entity 105-*a*.

In some cases, a RAN 315 may be shared between different operators (e.g., in a multi-operator core network (MOCN) architecture). That is the first network operator 305 may share the RAN 315 (e.g., and the network entity 105-*a* included in RAN 315) with the second network operator 310. For example, the UE 115-*b* of the second network operator 310 may be within the coverage area of the RAN 315 and outside a coverage area of a RAN for the second network operator 310. In some cases, RAN 315 may be shared with the second network operator 310 such that the UE 115-*b* of the second network operator 310 may connect with the RAN 315 of the first network operator 305. In some examples, this may be referred to as roaming in which a device connects to a network operator different from their own. While performing network sharing, the network entity 105-*a* of the RAN 315 may establish with and connect with the UE 115-*a* of the first network operator 305 via the communication link 125-*a* and with the UE 115-*b* of the second network operator 310 via the communication link 125-*b*. As such, both the first network operator 305 and the second network operator 310 may connect and communicate with the network entity 105-*a*. Further, the network entity 105-*a* may independently connect with the core network 130-*b* of the first network operator 305 and the core network 130-*c* of the second network operator 310.

In some examples, the network entity 105-*a* in the RAN 315 of the first network operator 305 may transmit a message that indicates each of the network operators supported by the RAN 315. The message may be a broadcast message, and may include the public land mobile network (PLMN) IDs of each network operator that the RAN 315 may be connected with. In some examples, a UE 115 may receive the broadcast message even if the UE 115 may be using a different network than the network operator of the network entity 105-*a*. For example, the UE 115-*b* of the second network operator 310 may receive the broadcast message from the network entity 105-*a* of the first network operator 305, which may indicate that the network entity 105-*a* may be connected with the core network 130-*c* of the second network operator 310. The UE 115-*b* may then establish the communication link 125-*b* and transmit one or more messages to the RAN 315 of the first network operator intended for the core network 130-*c* of the second network operator. In the one or more messages to the network entity 105-*a*, the UE 115-*b* may include the PLMN of the core network 130-*c* to indicate that the network entity 105-*a* should route the one or more messages to the core network 130-*c* of the second network operator.

In some cases, RANs 315 and core networks 130 of different network operators (e.g., the first network operator 305 and the second network operator 310) may connect using a gateway core network (GWCN) to share RANs 315. The GWCN may include a gateway MME that connects the core networks 130 to network entities 105-*a* of the RAN 315. As such, the gateway MME may declare and transmit the PLMN IDs of the connected core networks 130 to the RAN 315 so that the RAN 315 may determine which network operator core networks 130 (e.g., core network 130-*b* and core network 130-*c*) the network entities 105 may communicate with. Further, the gateway MME may also be aware of any shared PLMN IDs and the gateway MME may therefore be capable of forwarding messages to the corresponding core networks 130.

In FIG. 3, the RAN 315 may connect with core networks 130 via AMFs (e.g., a local AMF 320 and a remote AMF 330). For example, the UE 115-*a* of the first network operator 305 may communicate with the RAN 315 of the first network operator 305 and the corresponding network entity 105-*a* via the communication link 125-*a* and the network entity 105-*a* of the RAN 315 may communicate with the local AMF 320 of the first network operator 305 via the communication link 125-*c*. Further, the local AMF 320 of the first network operator 305 may communicate with the core network 130-*b* of the first network operator 305 via the communication link 125-*d*. As such, the UE 115-*a* may transmit messages to the core network 130-*b* of the first network operator 305 via the RAN 315 and the local AMF 320 of the first network operator 305.

In some cases, the UE 115-*b* of the second network operator 310 may transmit messages to the RAN 315 of the first network operator 305 that may be intended for the core network 130-*c* of the second network operator 310. However, the second network operator 310 may prefer to refrain from placing any local AMFs within the coverage area of the RAN 315 of the first network operator 305 (e.g., due to cost constraints, hardware constraints, or both). Without the placement of any local AMFs for the second network operator 310, the RAN 315 of the first network operator 305 may be unable to forward the messages from the UE 115-*b* of the second network operator 310 to the core network 130-*c* of the second network operator 310.

In wireless communications system 300, the RAN 315 may utilize an AMF proxy 325 to communicate with the first network operator 305 and the second network operator 310 without any local AMFs for the second network operator 310. The AMF proxy 325 may be a local AMF of the first network operator 305 that may be different from the local AMF 320 or may be the same as the local AMF 320. For example, a local AMF of the first network operator 305 may be dedicated for use as the AMF proxy 325 or the AMF proxy 325 may be integrated with an existing local AMF of the first network operator 305 (e.g., the local AMF 320 may act as the AMF proxy 325). In some examples, when the AMF proxy 325 may be different from the local AMF 320, the RAN 315 may refrain from establishing the communication link 125-*c* with the local AMF 320 of the first network operator 305 and may instead establish the communication link 125-*e* with the AMF proxy 325. The AMF proxy 325 may then establish the communication link 125-*f* with the remote AMF 330 of the second network operator 310 and the communication link 125-*g* with the local AMF 320 of the first network operator 305. The AMF proxy 325 may then be able to forward messages from the RAN 315 of the first network operator 305 to the core network 130-*c* of the second network operator 310.

Such techniques may make use of existing RAN 315 sharing procedure. For example, the techniques of the present disclosure the network entity 105-*a* of the RAN 315 broadcasting PLMN IDs of the operators connected to the AMF proxy 325 and allowing UEs 115 to select one of the broadcasted PLMNs. However, remote sharing PLMNs may be unable to connect between their AMFs and network entities 105. Further, the RAN 315 of the first network operator 305 may have an interface connection with each AMF of the first network operator 305 (e.g., the local AMF 320) and may be unable to connect with remote AMFs (e.g., remote AMF 330). As such, the AMF proxy 325 may transmit messages to remote AMFs of different operators (e.g., the remote AMF 330 of the second network operator 310) since the RAN 315 may be unable to do so. The AMF proxy 325 may receive messages from the network entity 105-*a* that may be from devices of the first network operator 305 (e.g., the UE 115-*a*) and messages from devices of the second network operator 310 (e.g., the UE 115-*b*). The AMF proxy 325 may distinguish the messages from each other and if a message is for the core network 130-*c* of the second network operator 310, the AMF proxy 325 may forward such messages to the remote AMF 330 via the communication link 125-*f* while refraining from processing or decoding the messages.

Additionally, or alternatively, the local AMF 320 may act as the AMF proxy 325 and the local AMF 320 may be directly connected with the remote AMF 330 (not illustrated). That is, the local AMF 320 may receive messages intended for both the core network 130-*b* of the first network operator 305 and the core network 130-*c* of the second network operator 310. In some examples, the local AMF 320 and the RAN 315 may communicate such configuration prior to establishing the communication link 125-*c*. In some other examples, the RAN 315 may learn that the local AMF 320 may act as the AMF proxy 325 while establishing the communication link 125-*c*.

For example, the network entity 105-*a* may be configured with the IP address of the local AMF 320 and the local AMF 320 may be configured to support remote PLMNs and their respective AMFs (e.g., the remote AMF 330) and may have already initialized connections with the respective AMFs. Further, while the RAN 315 establishes the communication link 125-*c* with the network entity 105-*a*, the RAN 315 may transmit a setup request message (e.g., NGAP SETUP REQUEST message) to the local AMF 320 and the RAN 315 may enquire about remote AMF connectivity. In some cases, the inquiry about remote AMF connectivity may be specific to a connection between the local AMF 320 of the first network operator 305 and the remote AMF 330 of the second network operator 310. In response to the setup request message, the local AMF 320 may process the setup request and transmit a reply message (e.g., NGAP SETUP RESPONSE message) where if the local AMF 320 may be able to support connections with remote AMFs of different operators, the message may include a list of such supported AMFs. In cases where the message included an enquiry about a specific remote AMF connection (e.g., the remote AMF 330) or a specific network operator (e.g., the second network operator 310), the list of supported connections may be limited to the initial enquiry from the network entity 105-*a*. Following receiving such indications, the RAN 315 may trigger additional setup request messages to be transmitted to such indicated remote AMFs where the additional setup request messages may be routed via the local AMF 320 to the indicated remote AMFs (E.g., remote AMF 330) via the communication link 125 between the local AMF 320 and the remote AMF 330.

In some cases, the communication link 125 between the local AMF 320 and the remote AMF 330 may be used solely for message transport and the local AMF 320 may refrain from processing or intercepting messages for the remote AMF 330 except to route messages from the RAN 315 of the first network operator 305 to the remote AMF 330 of the second network operator 310. The interface used for such connection may be a secure transport communication link 125 including IP connectivity or stream transmission control protocol (STCP)/IP. In cases where the STCP may be used, the remote AMF 330 may transmit messages as if the remote AMF 330 has a direct communication link with the network entity 105-*a* of the RAN 315. Further, to support such connections between AMFs of different network operators, network operators may have to cooperate with each other to establish connectivity across secure domains. For example, inter-operator connections (e.g., the communication link 125 between the local AMF 320 and the remote AMF 330) may use existing interfaces (e.g., N32 interface) between security edge protection proxies (SEPPs) of different PLMNs or different network operators. The architecture of the communication link may also assume a secure direct connection between the shared RAN 315 and a user plane function (UPF) of the second network operator 310 for traffic handling.

Therefore, using the AMF proxy 325, the RAN 315 may be able to be shared between different operators. In some examples, the architecture may extend to the RAN 315 being shared between more than 2 network operators. For example, the first network operator 305 and a third network operator may have local AMFs placed within the coverage area of the RAN 315 and may be able to share the RAN 315 using traditional techniques. However, in some cases, the local AMF 320 of the first network operator 305 may connect with the remote AMF 330 of the second network operator 310 and the local AMF of the third network operator may connect with a remote AMF of a fourth network architecture, where the local AMFs of the first network operator 305 and the third network operator may act as AMF proxies 325 for the RAN 315. As such, using the AMF proxy 325, the efficiency of communications in the wireless communications system 300 may increase as more operators may be able to share RANs 315 regardless of hardware constraints within the coverage area of the RAN 315. Further description of using the AMF proxy 325 and using the AMF proxy 325 as a transparent proxy may be described with reference to FIGS. 4-5.

Figure 4:
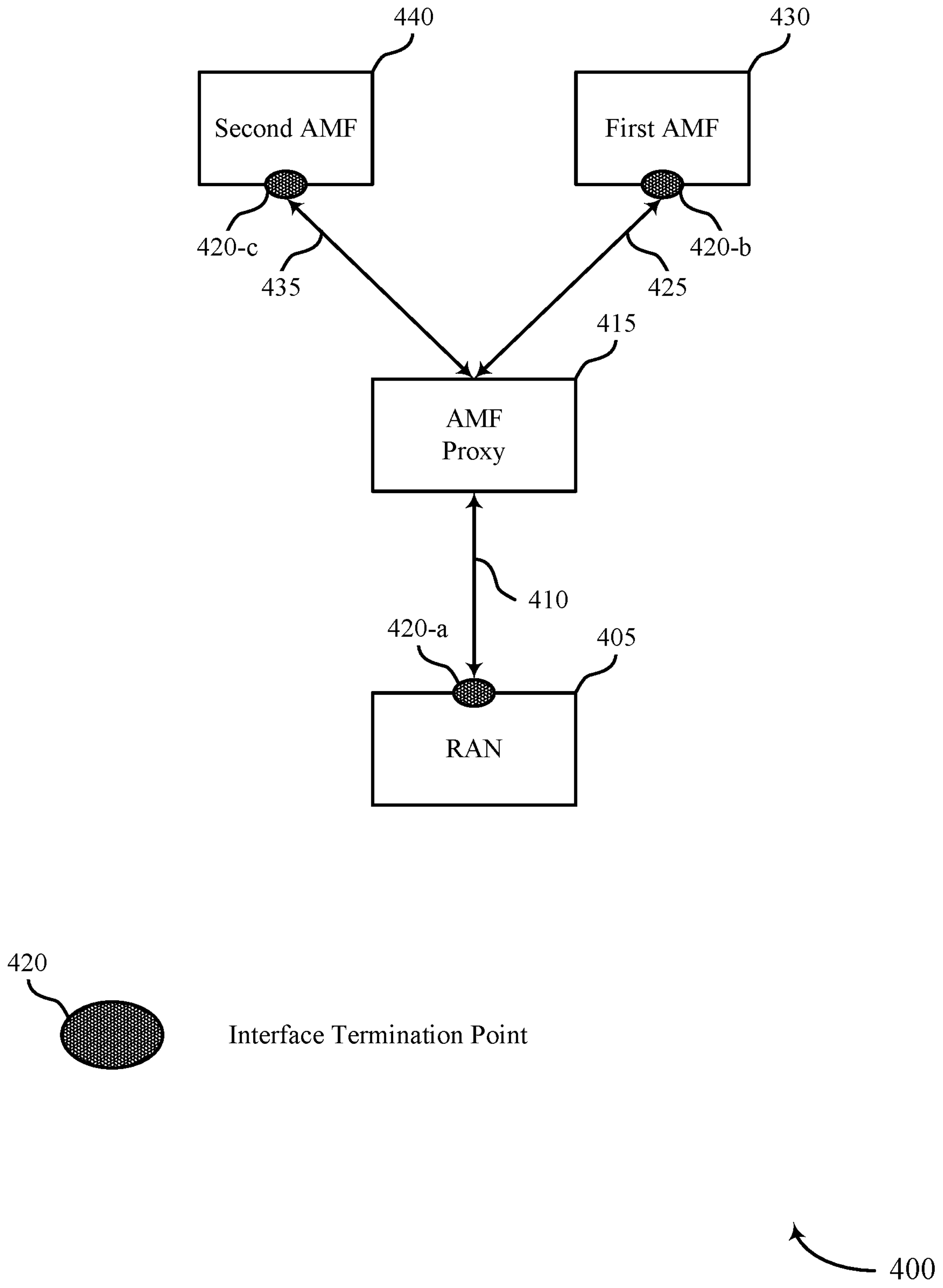
FIG. 4 shows an example of a network architecture that supports RAN sharing using a transparent proxy function in accordance with one or more aspects of the present disclosure.

FIG. 4 shows an example of a network architecture 400 that supports RAN sharing using a transparent proxy function in accordance with one or more aspects of the present disclosure. The network architecture 400 may illustrate an example for implementing one or more aspects of the wireless communications system 100 or 300. For example, the network architecture may include a RAN 405, an AMF proxy 415, a first AMF 430, and a second AMF 440, which may be examples of devices described herein. The first RAN 405, the AMF proxy 415, the first AMF 430, and the second AMF 440 may also communicate with each other using communication links (e.g., a communication link 410, a communication link 425, and a communication link 435). In some examples, the communication links may use interfaces for communicating with the RAN 405, the AMF proxy 415, the first AMF 430, and the second AMF 440 that may terminate at interface termination points 420 (e.g., an interface termination point 420-*a*, an interface termination point 420-*b*, and an interface termination point 420-*c*).

In some examples, the AMF proxy 415 may be referred to as a transparent proxy. When utilizing the AMF proxy 415 as a transparent proxy, the RAN 405, which may be subscribed to or services by a first network operator, may establish a connection with the first AMF 430 which may be a local AMF of the first network operator. The RAN 405 may also establish a connection with the second AMF 440 which may be a remote AMF of a second network operator. As described with reference to FIG. 2, the first AMF 430 may be in communication with a core network for the first network operator and the second AMF 440 may be in communication with a core network for the second network operator. As such, the AMF proxy 415 may forward messages intended for the core network of the first network operator to the first AMF 430 and forward messages intended for the core network of the second network operator to the second AMF 440.

To initialize communications, the RAN 405 may set up an interface (e.g., an new generation application protocol (NGAP) interface) via the communication link 410 with the AMF proxy 415. The interface may terminate at the interface termination point 420-*a* at the RAN 405 and in some cases may refrain from terminating at the AMF proxy 415 as the AMF proxy 415 may forward messages to the first AMF 430 or the second AMF 440. The AMF proxy 415 may forward messages using the interface transparently to the first AMF 430 or to the second AMF 440, that is the AMF proxy 415 may refrain from decoding, processing, or manipulating the message. As such, the AMF proxy 415 may be memory-less and may refrain from storing any data related to the RAN 405, the first AMF 430, or related to the second AMF 440. In some examples, using the interface initialized with the AMF proxy 415, the RAN 405 may initialize additional interfaces with additional AMFs (e.g., the first AMF 430 and the second AMF 440) which may be associated with different network operators than that of the RAN 405, via the AMF proxy 415. For example, the AMF proxy 415 may initialize an interface between the AMF proxy 415 and the first AMF 430 of the first network operator via the communication link 425, terminating at the interface termination point 420-*b* at the first AMF 430. Further, the AMF proxy 415 may initialize an interface between the AMF proxy 415 and the second AMF 440 of the second network operator via the communication link 435, terminating at the interface termination point 420-*c* at the second AMF 440

To determine which AMF the AMF proxy 415 is forward a message (e.g., an NGAP message), the RAN 405 may include a source ID and a target AMF ID for the AMF proxy 415 to use when transmitting messages to the first AMF 430 or to the second AMF 440. In some cases, as the communication link and interface between the RAN 405 and the first AMF 430 may be implicit, the inclusion of the target AMF ID may allow the AMF proxy 415 to identify to which network operator and associated AMF to forward the message. As such, the AMF proxy 415 may forward upstream (e.g., uplink) messages from the RAN 405 to the first AMF 430 via the communication link 425 or to the second AMF 440 via the communication link 435 based on the target AMF ID included in message, while refraining from decoding, processing, or manipulating the message. In some cases, the source ID and the target AMF ID may be included in the header of a message and the AMF proxy 415 may process the message header but may refrain from further decoding the contents of the message. Additionally, or alternatively, based on the network operator of a UE 115 that transmits a message to a network entity 105 of the RAN 405, the RAN 405 may transmit the message to the corresponding AMF (e.g., the first AMF 430 for the first network operator and the second AMF 440 for the second network operator) via the AMF proxy 415. As such, based on the network operator of the UE 115 that transmits messages to the RAN 405, the RAN 405 may select which AMF to send messages to via the AMF proxy 415.

To determine which AMFs the RAN 405 may communicate with, the RAN 405 may be configured with AMF IDs for each AMF in communication with the AMF proxy 415 (e.g., the PLMNs in communication with the AMF proxy 415). When the RAN 405 transmits the message to the AMF proxy 415, the AMF proxy 415 may transparently forward the message to the first AMF 430 or the second AMF 440 based on the message including the source ID and the target AMF ID. In some examples, the AMF proxy 415 may forward or transmit the message from the RAN 405 to the first AMF 430 or to the second AMF 440 based on the RAN 405 including the source ID and target AMF ID the message header or in a routing information element of the message header. In some cases, the routing information element may include a global unique AMF ID (GUAMI) of the target AMF. That is, the target AMF ID may be a GUAMI, where each AMF (e.g., the first AMF 430 and the second AMF 440) may be associated with a GUAMI. As such, the AMF proxy 415 may be able to determine to which AMF (e.g., the first AMF 430 or the second AMF 440) the message should be forwarded based on the target AMF ID. Additionally, or alternatively, the AMF proxy 415 may receive a second message from the first AMF 430 or from the second AMF 440 for the RAN 405. As such, in some cases, the second message may include a source AMF ID and a target RAN ID, which may be included in a routing information element.

In some examples, the AMF proxy 415 may be an AMF with no traffic (e.g., no UEs 115 may send messages to that AMF) or the AMF proxy 415 may be a local AMF or integrated with a local AMF of the first network operator. When the AMF proxy 415 may be integrated with a local AMF (e.g., the first AMF 430 acts as the AMF proxy 415) the AMF proxy 415 may be referred to as an integrated AMF proxy 415. Further, any reference to the AMF proxy 415 elsewhere herein may refer to a dedicated AMF for the AMF proxy 415 or the first AMF 430 integrated with the AMF proxy 415. When the first AMF 430 acts as the AMF proxy 415, the first AMF 430 may receive messages from the RAN 405 that are intended for the first AMF 430 and intended for the second AMF 440. In such cases, if the RAN 405 transmits a message intended for the first AMF 430, the interface used may terminate at both the RAN 405 and the first AMF 430. As such, a communication link 125 may be directly established between the RAN 405 and the first AMF 430. However if the message is intended for the second AMF 440 of the second network operator, the first AMF 430 may refrain from terminating the interface and forward the message to the second AMF 440 via a communication link 125 established between the first AMF 430 and the second AMF 440.

In some examples, when the RAN 405 transmits messages intended for the first AMF 430, to reduce signaling overhead the RAN 405 may refrain from including the routing information and the target AMF ID as the first network operator may operate both the RAN 405 and the first AMF 430. Therefore, when receiving messages from the RAN 405, the AMF proxy 415 may first check to see if any routing information has been indicated in the message header before decoding of processing the message. If the message indicates any routing information, the AMF proxy 415 may forward the message in accordance with the routing information and refrain from decoding the contents of the message. In cases where the first AMF 430 may be acting as the AMF proxy 415, if the first AMF 430 detects a lack of routing information, the first AMF 430 may begin processing the message as the message may be intended for the first AMF 430. In some other examples, the first AMF 430 acting as the AMF proxy 415 may store an index of GUAMIs of other AMFs (e.g., the second AMF 440) to use for future communications. As such, the RAN 405 may use the index in the routing information to further reduce the signaling overhead.

To know what information to include in the routing information, the RAN 405 may be configured with the IP address of both the first AMF 430 and the second AMF 440. The RAN 405 may also be configured with a list of local IP addresses corresponding to local AMFs for the first network operator (e.g., the first AMF 430) and a list of remote AMF IDs which may be the GUAMIs of remote AMFs (e.g., the second AMF 440) to connect with both local AMFs (e.g., the first AMF 430) and remote AMFs (e.g., the second AMF 440). The list of local IP addresses may include the IP address of the first AMF 430 and the list of remote AMF IDs may include the AMF ID of the second AMF 440.

When initializing communications with the second AMF 440, the RAN 405 may transmit a setup request message (e.g., an NGAP Setup Request message) to the AMF proxy 415 or in some cases to the first AMF 430 acting as the AMF proxy 415. In some cases, the RAN 405 may have previously initialized the connection between the RAN 405 and the AMF proxy 415 (e.g., the communication link 410) and the setup request message may include routing information for the second AMF 440. The routing information for the second AMF 440 may include the AMF ID of the second AMF 440 from the list of remote AMF IDs that the RAN 405 may be configured with. When receiving the setup request message, the AMF proxy 415 may check for the presence of the routing information in the setup request message and based on the target AMF ID indicating the AMF ID of the second AMF 440, the AMF proxy 415 may forward the setup request message to the second AMF 440, if a connection is available (e.g., the communication link 435), while refraining from decoding or processing the contents of the message. The second AMF 440 may then receive and process the setup request message and transmit a setup response message (e.g., a NGAP Setup Response message) via the communication link 435 to the AMF proxy 415. The set up response message may include both the ID of the second AMF 440 (e.g., a source AMF ID) and a target RAN ID (e.g., the ID or address of the RAN 405). In some examples, the second AMF 440 may associate the target RAN ID with the GUAMI of the AMF proxy 415 or the first AMF 430 acting as the AMF proxy 415. As such, the second AMF 440 may know that to send the message to the RAN 405, the message should first be send to the AMF proxy 415.

The AMF proxy 415 may then receive the setup response message and based on the target RAN ID for the RAN 405 being included in the routing information or the header the setup response message, the AMF proxy 415 may forward the setup response message to the RAN 405 via the communication link 410. Similar to the setup request message, the AMF proxy 415 may also refrain from processing or decoding the setup response message. The RAN 405 may receive the setup response message from the AMF proxy 415 and may consider the connection to the second AMF 440 as established. In cases where the connection with the second AMF 440 may be the first connection with an AMF of the second network operator, the RAN 405 may transmit a broadcast message indicating to UEs 115 of the second network operator that the UEs 115 may transmit messages to the RAN 405 of the first network operator.

As such, the inclusion of a source ID and a target ID may be valuable for communications with the AMF proxy 415 to avoid ambiguity in communications between the RAN 405, the first AMF 430, and the second AMF 440 via the AMF proxy 415. For example, the target ID may allow the AMF proxy 415 to know which device (e.g., the RAN 405, the first AMF 430, or the second AMF 440) the AMF proxy 415 should forward the message to. Additionally, or alternatively, the source ID may allow the receiving device to know which device sent the message and therefore the source ID may aid in decoding the message from the AMF proxy 415. Therefore, for uplink communications (e.g., from the RAN 405 to the first AMF 430 or the second AMF 440), the message routing information may include a source RAN ID and a target AMF ID (e.g., GUAMI of the first AMF 430 or of the second AMF 440). Following, for downlink communications (e.g., from the first AMF 430 or the second AMF 440 to the RAN 405), the message routing may include a source AMF ID (e.g., GUAMI of the first AMF 430 or of the second AMF 440) and a target RAN ID.

In some cases, the RAN 405 may use the same PLMN as the AMF the RAN 405 may be connected to. Thus, the RAN 405 may be associated with a local ID for the PLMN of the local AMF (e.g., the first AMF 430) and a remote ID for the PLMN of the remote AMF (e.g., the second AMF 440). The RAN 405 may use the local ID for establishing the connection between the RAN 405 and the first AMF 430 via the AMF proxy and may use the remote ID for establishing the connection between the RAN 405 and the second AMF 440. As such, for downlink communications, when the AMF proxy 415 may be integrated within the first AMF 430, the first AMF 430 may create a routing table to associate the local ID and the remote ID from the RAN 405. Additionally, or alternatively, the first AMF 430 may assign a node ID to the RAN 405 regardless of the PLMN of the RAN 405 or the AMFs connected to the RAN 405. As such, the node ID may be independent from the RAN 405. Using the node ID, the RAN 405 may indicate the PLMN ID, the node ID, together with the target AMF ID in the routing information of a message. Further, the first AMF 430 or the second AMF 440 may use the node ID to indicate the RAN 405 for subsequent downlink communications.

In some cases, when the first AMF 430 may be acting as the AMF proxy 415, to reduce the signaling overhead the first AMF 430 may store an index of both target AMF IDs and target RAN IDs. For example, after the initial connection with the second AMF 440, the first AMF 430 may assign an index value to the GUAMI of the second AMF 440, and the first AMF 430 may transmit the index value to the RAN 405 for use in future communications. The index values may be unique from each other and may remain the same during communications to provide for a reduction in any ambiguity and reduce the probability of ID clashes. In some cases, when the second AMF 440 may be the only AMF of the second network operator, the index value for the second AMF 440 may be for both the second AMF 440 and the PLMN of the second network operator, otherwise the index value may be for the second AMF 440. As such, for subsequent communications from the RAN 405 to the second AMF 440, the RAN 405 may include the PLMN ID of the second network operator and the index of the second AMF 440 or just the index value of the second AMF 440.

In some examples, the network architecture 400 may have a set of AMF proxies including the AMF proxy 415. Therefore, the RAN 405 may transmit messages to different AMF proxies to communicate with the local AMF of the first network operator (e.g., the first AMF 430) or with the remote AMF of the second network operator (e.g., the second AMF 440). In some cases, using the same AMF proxy (e.g., the AMF proxy 415) may allow for the latency and delay to be constant for all communications. In some other cases, using a different AMF proxy to communicate with different remote AMFs of different network operators may result in a decrease in latency and delay in communications based on the location of the AMF proxy being used. Further, the first AMF 430 and the second AMF 440 may use any AMF proxy configured in the network architecture 400 (e.g., the AMF proxy 415) to communicate with the RAN 405, however the first AMF 430 and the second AMF 440 may generally use the same AMF proxy (e.g., the AMF proxy 415) used to receive messages from the RAN 405 to then send reply messages and additional messages to the RAN 405.

In some other examples, the network architecture 400 may also include a set of RANs including the RAN 405. In such examples, each RAN may be connected with the AMF proxy 415 to communicate with the first AMF 430 and the second AMF 440 and the AMF proxy 415 may multiplex the messages from the multiple RANs to send to the first AMF 430 and the second AMF 440. For example, the AMF proxy 415 may receive multiple messages from the set of RANs that may be intended for the first AMF 430, the second AMF 440, or both. The AMF proxy 415 may multiplex all the messages for the first AMF 430 together into a first multiplexed message and all the messages for the second AMF 440 together into a second multiplexed message. Further, when the first AMF 430 and the second AMF 440 receive the first multiplexed message or the second multiplexed message respectively, having the source RAN ID included in the messages may allow the first AMF 430 and the second AMF 440 to more accurately decode the messages and separate the messages from the different RANs.

As described herein, using the techniques of the present disclosure herein may allow for the RAN 405 to communicate with both the first AMF 430 of the first network operator and the second AMF 440 of the second network operator via the AMF proxy 415, which may allow for a more efficient use of resources and a reduction in latency. Specifically, such techniques describe the AMF proxy 415 being used as a transparent proxy and the messages sent to the AMF proxy 415 may include both a source ID and a target ID. Further descriptions of the AMF proxy 415 being utilized as a transparent proxy may be described with reference to FIG. 5.

Figure 5:
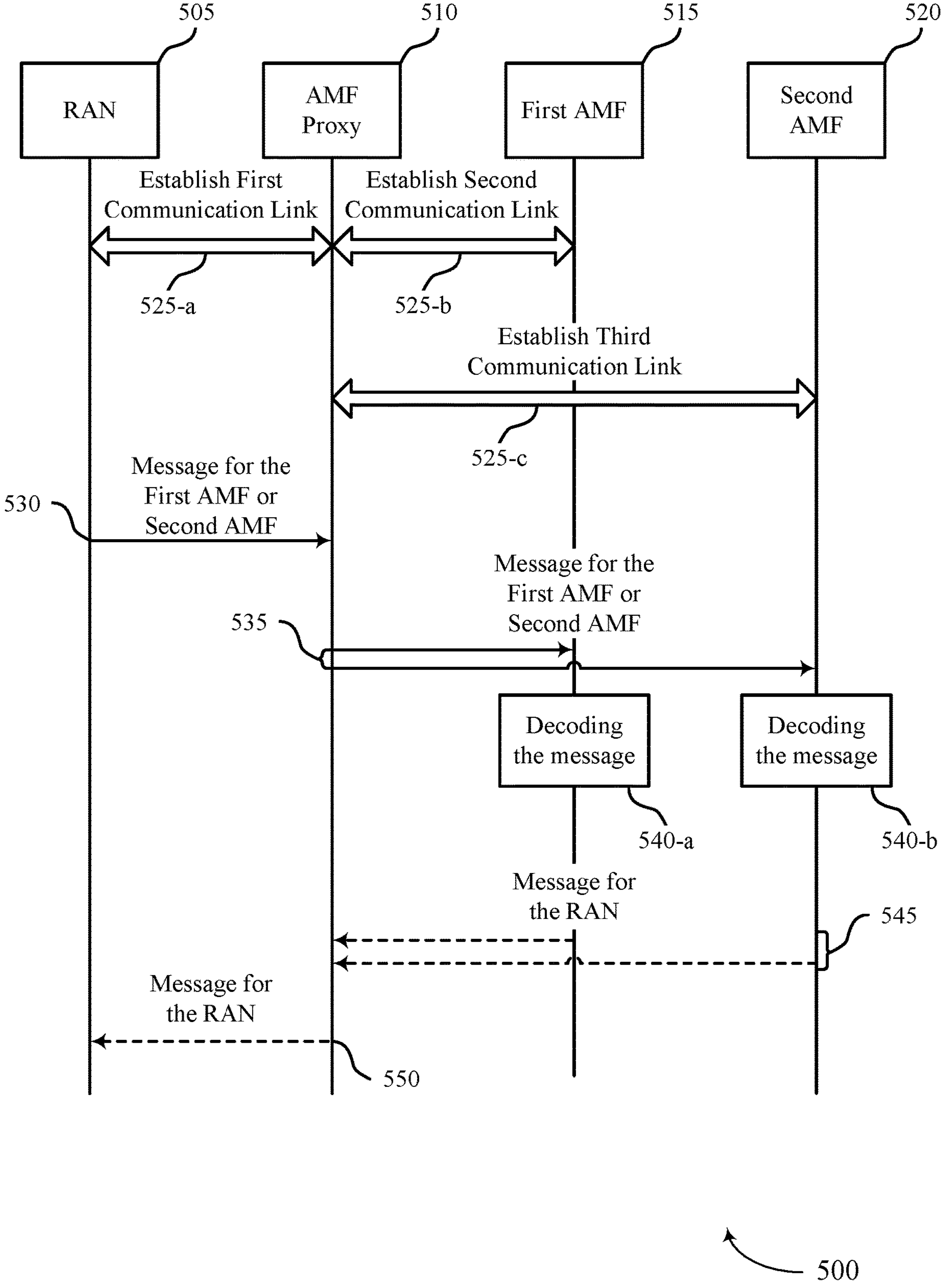
FIG. 5 shows an example of a process flow that supports RAN sharing using a transparent proxy function in accordance with one or more aspects of the present disclosure.

FIG. 5 shows an example of a process flow 500 that supports RAN sharing using a transparent proxy function in accordance with one or more aspects of the present disclosure. In some examples, the process flow 500 may implement or be implemented by the wireless communications system 100 or the wireless communications system 300. For example, the process flow 500 may include a RAN 505 of a first network operator, an AMF proxy 510, a first AMF 515 of the first network operator, and a second AMF 520 of a second network operator, which may be examples of devices described herein with reference to FIGS. 1-3.

In the following description of the process flow 500, the operations between the RAN 505, the AMF proxy 510, the first AMF 515, and the second AMF 520 may be performed in different orders or at different times. Some operations may also be left out of the process flow 500, or other operations may be added. Although the RAN 505, the AMF proxy 510, the first AMF 515, and the second AMF 520 are shown performing the operations of the process flow 500, some aspects of some operations may also be performed by one or more other wireless devices.

At 525-*a*, the AMF proxy 510 may establish a first communication link between the AMF proxy 510 and the RAN 505 associated with the first network operator. At 525-*b*, the AMF proxy 510 may establish a second communication link between the AMF proxy 510 and the first AMF 515 associated with the first network operator. At 525-*c*, the AMF proxy 510 may establish a third communication link between the AMF proxy 510 and the second AMF 520 associated with a second network operator.

In some cases, the first communication link may be established directly between the first AMF 515 associated with the first network operator and the RAN 505 associated with the first network operator. Further, the second communication link may be established between the first AMF 515 associated with the first network operator and the second AMF 520 associated with the second network operator. In such case, the first AMF 515 may act as the AMF proxy 510. In some examples, as part of establishing the first communication link, the AMF proxy 510 may transmit a second message from the first AMF 515 to the RAN 505 indicating support for establishing a communication link with an AMF of a network operator different from the first network operator (e.g., the second AMF 520 of the second network operator). As such, the second communication link may be established between the first AMF 515 and the second AMF 520 based on the first AMF 515 acting as the AMF proxy 510 (e.g., being included in or implemented by (via software, hardware, or both) first AMF 515) and the second message from the first AMF 515.

In some examples, at 525-*a*, the AMF proxy 510 may establish a set of communication links between the first AMF 515 and a set of RANs, the set of communication links including the first communication link and the set of RANs including the RAN 505 (e.g., the RAN 505 may be referred to as a first RAN 505).

At 530, the AMF proxy 510 may receive a message, from the RAN 505 via the first communication link, the message including a source ID associated with a network entity of the RAN 505 and a target AMF ID. At 535, the AMF proxy 510 may transmit the message to the first AMF 515 via the second communication link based on the target AMF ID indicating the ID (e.g., GUAMI) of the first AMF 515 or the AMF proxy 510 may transmit the message to the second AMF 520 via the third communication link based on the target AMF ID indicating the ID of the second AMF 520. In some cases, the message may include the source ID and the target AMF ID as part of a routing information element in the message. Further, the target AMF ID may also include an PLMN ID.

In some examples, at 530, the AMF proxy 510 may receive a message, from the RAN 505 via the first communication link, the message being for the second AMF 520. In some cases, the message may be the first message exchanged between the RAN 505 and the AMF proxy 510, and the third communications link may not exist between the AMF proxy 510 and the second AMF 520. As such, the AMF proxy may establish the third communications link following reception of the message from the RAN 505. After establishing the third communication link, the AMF proxy 510 may transmit (e.g., forward) the message to the second AMF 520.

In some other examples, at 530, the AMF proxy 510 may receive a set of messages from the set of RANs via a set of communication links between each respective RAN and the AMF proxy 510. Each respective message of the set of messages may include a respective source ID indicating a respective network entity of a respective RAN of the set of RANs and a respective target AMF ID indicating the ID of the first AMF 515 or the second AMF 520. The AMF proxy 510 may multiplex one or more messages, from the set of messages, that have the same target AMF ID together. That is, the AMF proxy 510 may multiplex the one or more messages that have the same target AMF ID indicating the first AMF 515 into a first multiplexed message and the AMF proxy 510 may multiplex the one or messages that have the same target AMF ID indicating the second AMF 520 into a second multiplexed message. As such, at 535, the AMF proxy 510 may transmit the first multiplexed message to the first AMF 515 and transmit the second multiplexed message to the second AMF 520.

Additionally, or alternatively, at 530, the AMF proxy 510 may receive a first message from the RAN 505 via the first communication link, the first message including the source ID and the target AMF ID which may further include a corresponding PLMN ID. Using the target AMF ID, and to reduce further signaling overhead, the AMF proxy 510 (e.g., the first AMF 515 integrated with the AMF proxy 510) may store an index of the target AMF ID and the corresponding PLMN ID and assign an index value to the target AMF ID. The AMF proxy 510 may then transmit the index value to the RAN 505 for use in subsequent communications. Following, the AMF proxy 510 may receive a second message from the RAN 505 via the first communication link, the second message including the source ID, the index value for the target AMF ID, and the corresponding ID. The AMF proxy 510 may then be able to determine which AMF ID is associated with the index value based on a table associated the target AMF IDs and PLMN IDs.

At 540-*a*, the first AMF 515 may decode the message sent from the AMF proxy 510 at 535, based on the target AMF ID indicating the ID of the first AMF 515. At, 540-*b* the second AMF 520 may decode the message sent from the AMF proxy 510 at 535, based on the target AMF ID indicating the ID of the second AMF 520. In some examples, when the first AMF 515 may be integrated with the AMF proxy 510, the first AMF 515 may receive the message from the RAN 505 including the source ID and a target AMF ID indicating the AMF ID of the second AMF 520. As such, the first AMF 515 may refrain from decoding the message from the RAN 505 and may transmit the message to the second AMF 520 based on the target AMF ID. In some other examples, the first AMF 515, the second AMF 520, or both may receive a multiplexed message from the AMF proxy 510, the multiplexed message including one or more messages having a same target AMF ID. The first AMF 515, the second AMF 520, or both may then decode the one or more messages received via the multiplexed messages. In some cases, the first AMF 515, the second AMF 520, or both may use the source ID to aid in decoding and separating the one or more messages in the multiplexed message.

At 545, in some examples, the AMF proxy 510 may receive a second message from the first AMF 515 via the second communication link or receive a message from the second AMF 520 via the third communication link, the message including a source AMF ID and a target RAN ID. In some cases, the second message may include the source AMF ID and the target RAN ID as part of a routing information element in the second message. At 550, the AMF proxy 510 may transmit the message to the RAN 505 based on the target RAN ID included in the message indicating the RAN ID of the RAN 505. The RAN 505 may then decode the message based on the target RAN ID and the source AMF ID.

Figure 6:
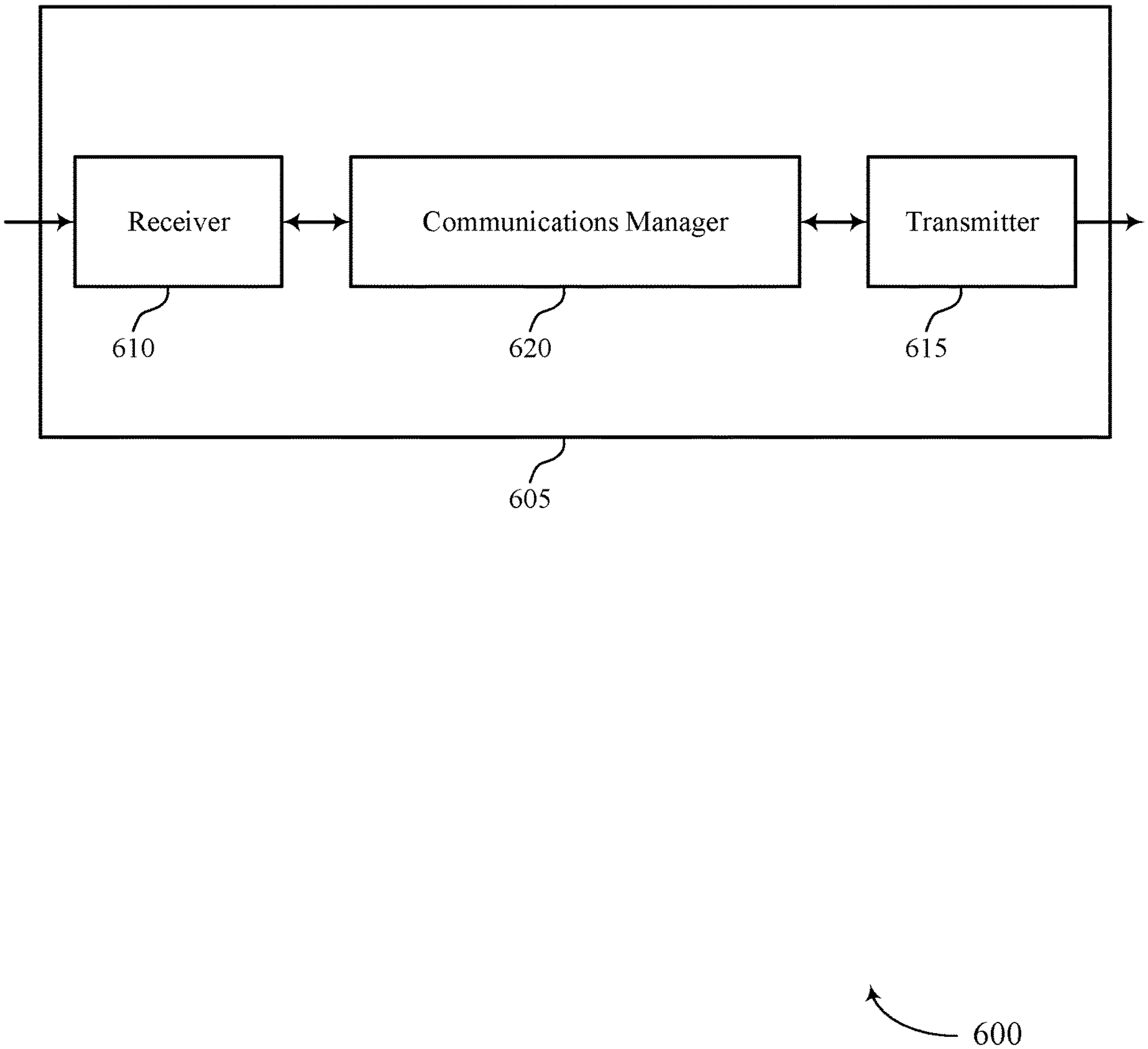
FIGS. 6 and 7 show block diagrams of devices that support RAN sharing using a transparent proxy function in accordance with one or more aspects of the present disclosure.

FIG. 6 shows a block diagram 600 of a device 605 that supports RAN sharing using a transparent proxy function in accordance with one or more aspects of the present disclosure. The device 605 may be an example of aspects of an AMF proxy as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to RAN sharing using a transparent proxy function). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to RAN sharing using a transparent proxy function). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of RAN sharing using a transparent proxy function as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at an AMF proxy in accordance with examples as disclosed herein. For example, the communications manager 620 is capable of, configured to, or operable to support a means for establishing a first communication link between the AMF proxy and a first RAN associated with a first network operator, a second communication link between the AMF proxy and a first AMF associated with the first network operator, and a third communication link between the AMF proxy and a second AMF associated with a second network operator. The communications manager 620 is capable of, configured to, or operable to support a means for receiving, from the first RAN via the first communication link, a message including a source ID associated with a network entity of the first RAN and including a target AMF ID. The communications manager 620 is capable of, configured to, or operable to support a means for transmitting the message to the first AMF via the second communication link based on the target AMF ID corresponding to the first AMF or transmitting the message to the second AMF via the third communication link based on the target AMF ID corresponding to the second AMF.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for using an AMF proxy to communicate with multiple network operators for reduced processing and more efficient utilization of communication resources.

Figure 7:
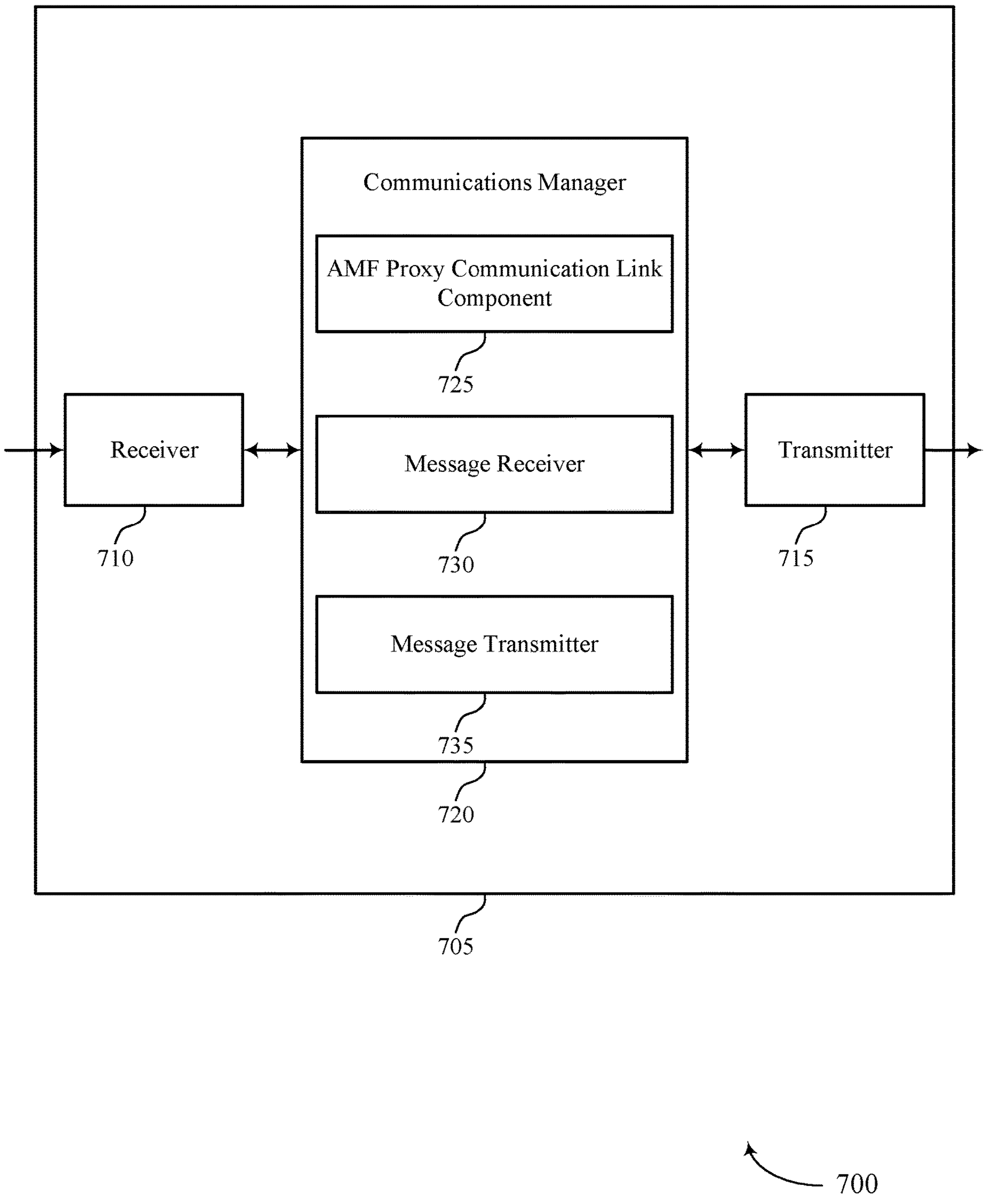

FIG. 7 shows a block diagram 700 of a device 705 that supports RAN sharing using a transparent proxy function in accordance with one or more aspects of the present disclosure. The device 705 may be an example of aspects of a device 605 or an AMF proxy as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to RAN sharing using a transparent proxy function). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to RAN sharing using a transparent proxy function). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of RAN sharing using a transparent proxy function as described herein. For example, the communications manager 720 may include an AMF proxy communication link component 725, a message receiver 730, a message transmitter 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at an AMF proxy in accordance with examples as disclosed herein. The AMF proxy communication link component 725 is capable of, configured to, or operable to support a means for establishing a first communication link between the AMF proxy and a first RAN associated with a first network operator, a second communication link between the AMF proxy and a first AMF associated with the first network operator, and a third communication link between the AMF proxy and a second AMF associated with a second network operator. The message receiver 730 is capable of, configured to, or operable to support a means for receiving, from the first RAN via the first communication link, a message including a source ID associated with a network entity of the first RAN and including a target AMF ID. The message transmitter 735 is capable of, configured to, or operable to support a means for transmitting the message to the first AMF via the second communication link based on the target AMF ID corresponding to the first AMF or transmitting the message to the second AMF via the third communication link based on the target AMF ID corresponding to the second AMF.

Figure 8:
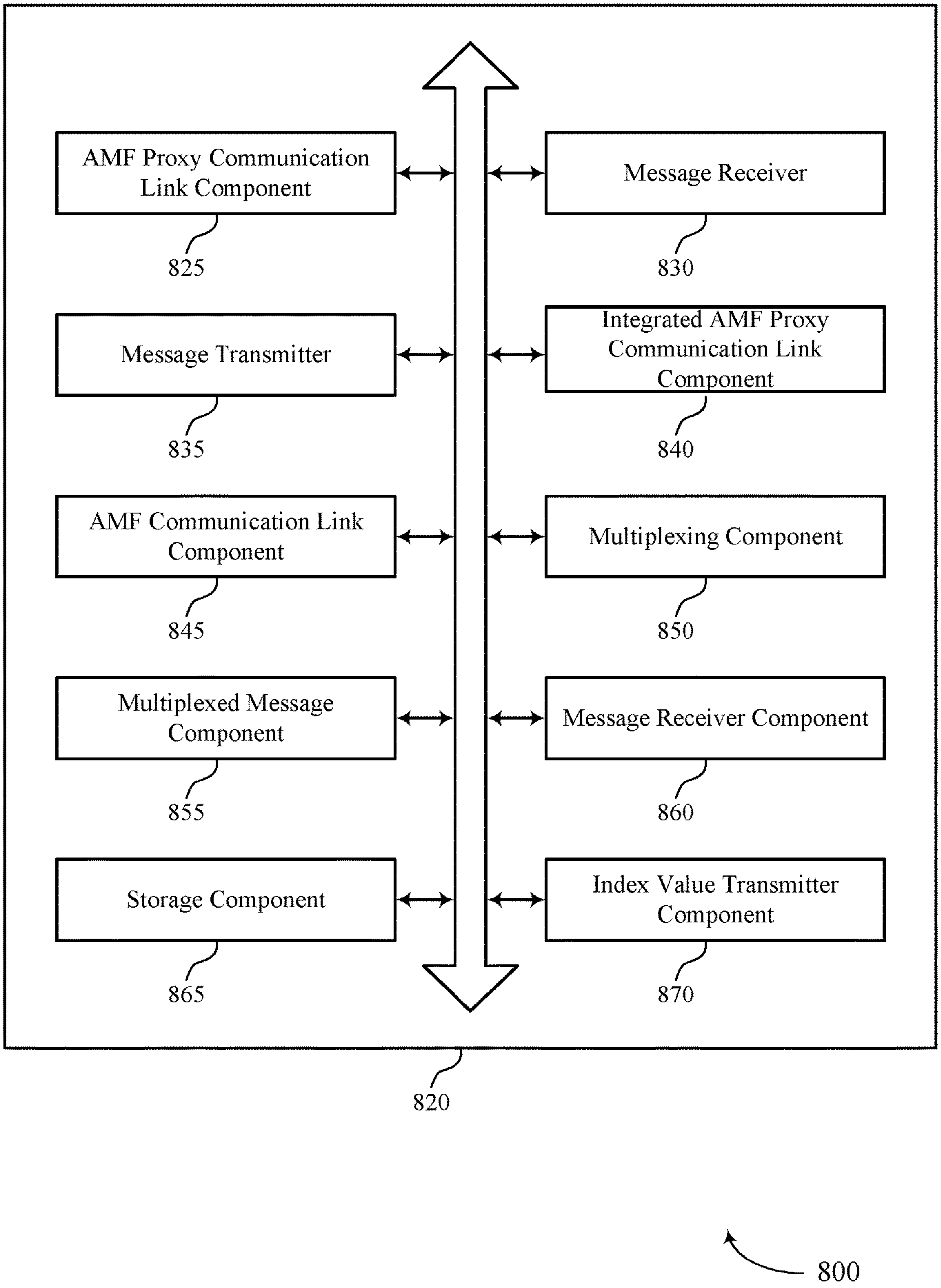
FIG. 8 shows a block diagram of a communications manager that supports RAN sharing using a transparent proxy function in accordance with one or more aspects of the present disclosure.

FIG. 8 shows a block diagram 800 of a communications manager 820 that supports RAN sharing using a transparent proxy function in accordance with one or more aspects of the present disclosure. The communications manager 820 may be an example of aspects of a communications manager 620, a communications manager 720, or both, as described herein. The communications manager 820, or various components thereof, may be an example of means for performing various aspects of RAN sharing using a transparent proxy function as described herein. For example, the communications manager 820 may include an AMF proxy communication link component 825, a message receiver 830, a message transmitter 835, an integrated AMF proxy communication link component 840, an AMF communication link component 845, a multiplexing component 850, a multiplexed message component 855, a message receiver component 860, a storage component 865, an index value transmitter component 870, or any combination thereof. Each of these components may communicate, directly or indirectly, with one another (e.g., via one or more buses).

The communications manager 820 may support wireless communications at an AMF proxy in accordance with examples as disclosed herein. The AMF proxy communication link component 825 is capable of, configured to, or operable to support a means for establishing a first communication link between the AMF proxy and a first RAN associated with a first network operator, a second communication link between the AMF proxy and a first AMF associated with the first network operator, and a third communication link between the AMF proxy and a second AMF associated with a second network operator. The message receiver 830 is capable of, configured to, or operable to support a means for receiving, from the first RAN via the first communication link, a message including a source ID associated with a network entity of the first RAN and including a target AMF ID. The message transmitter 835 is capable of, configured to, or operable to support a means for transmitting the message to the first AMF via the second communication link based on the target AMF ID corresponding to the first AMF or transmitting the message to the second AMF via the third communication link based on the target AMF ID corresponding to the second AMF.

In some examples, the integrated AMF proxy communication link component 840 is capable of, configured to, or operable to support a means for establishing the first communication link directly between the first AMF associated with the first network operator and the first RAN associated with the first network operator. In some examples, the integrated AMF proxy communication link component 840 is capable of, configured to, or operable to support a means for establishing the second communication link between the first AMF associated with the first network operator and the second AMF associated with the second network operator, where the first AMF acts as the AMF proxy.

In some examples, the message transmitter 835 is capable of, configured to, or operable to support a means for transmitting, as part of establishing the first communication link between the first RAN and the first AMF, a second message to the first RAN, the second message indicating support for establishing a communication link with an AMF of a network operator that is different than the first network operator. In some examples, the AMF communication link component 845 is capable of, configured to, or operable to support a means for establishing the second communication link between the first AMF and the second AMF based on the first AMF acting as the AMF proxy and on the second message.

In some examples, the AMF proxy communication link component 825 is capable of, configured to, or operable to support a means for establishing a set of multiple communication links between the AMF proxy and a set of multiple RANs, where the set of multiple communication links includes the first communication link and the set of multiple RANs includes the first RAN.

In some examples, the message receiver 830 is capable of, configured to, or operable to support a means for receiving, from the set of multiple RANs via the set of multiple communication links between the AMF proxy and the set of multiple RANs, a set of multiple messages, each message of the set of multiple messages including a respective source ID associated with a respective network entity of a respective RAN of the set of multiple RANs and a respective target AMF ID associated with one of the first AMF or the second AMF. In some examples, the multiplexing component 850 is capable of, configured to, or operable to support a means for multiplexing one or more messages that have a same target ID together, the one or more messages being from the set of multiple messages, where the one or more messages with the same target ID associated with the first AMF are multiplexed together in a first multiplexed message and the one or more messages with the same target ID associated with the second AMF are multiplexed together into a second multiplexed message. In some examples, the multiplexed message component 855 is capable of, configured to, or operable to support a means for transmitting the first and second multiplexed messages to respective AMFs of the first AMF and the second AMF.

In some examples, to support receiving the message from the first radio access network via the first communication link, the message receiver 830 is capable of, configured to, or operable to support a means for receiving the message including the source ID and the target AMF ID as part of a routing information element in the message. In some examples, the target AMF ID includes a PLMN ID.

In some examples, the message receiver 830 is capable of, configured to, or operable to support a means for receiving a first message from the first RAN via the first communication link, the first message including the source identifier and the target AMF identifier, the target AMF identifier including a corresponding PLMN identifier. In some examples, the storage component 865 is capable of, configured to, or operable to support a means for storing an index of the target AMF identifier and the corresponding PLMN identifier and associating the target AMF identifier with an index value. In some examples, the index value transmitter component 870 is capable of, configured to, or operable to support a means for transmitting the index value to the first radio access network. In some examples, the message receiver 830 is capable of, configured to, or operable to support a means for receiving a second message from the first radio access network via the first communication link, the second message including the source identifier, the index value for the target AMF identifier, and the corresponding PLMN identifier.

In some examples, the message receiver 830 is capable of, configured to, or operable to support a means for receiving a second message from the first AMF via the second communication link or from the second AMF via the third communication link, the second message including a source AMF ID and a target RAN ID. In some examples, the message transmitter 835 is capable of, configured to, or operable to support a means for transmitting a second message to the first RAN via the first communication link based on the target RAN ID.

In some examples, to support receiving the second message from the first AMF via second communication link or from the second AMF via the third communication link, the message receiver 830 is capable of, configured to, or operable to support a means for receive the second message including the source AMF ID and the target RAN ID as part of a routing information element in the second message.

Figure 9:
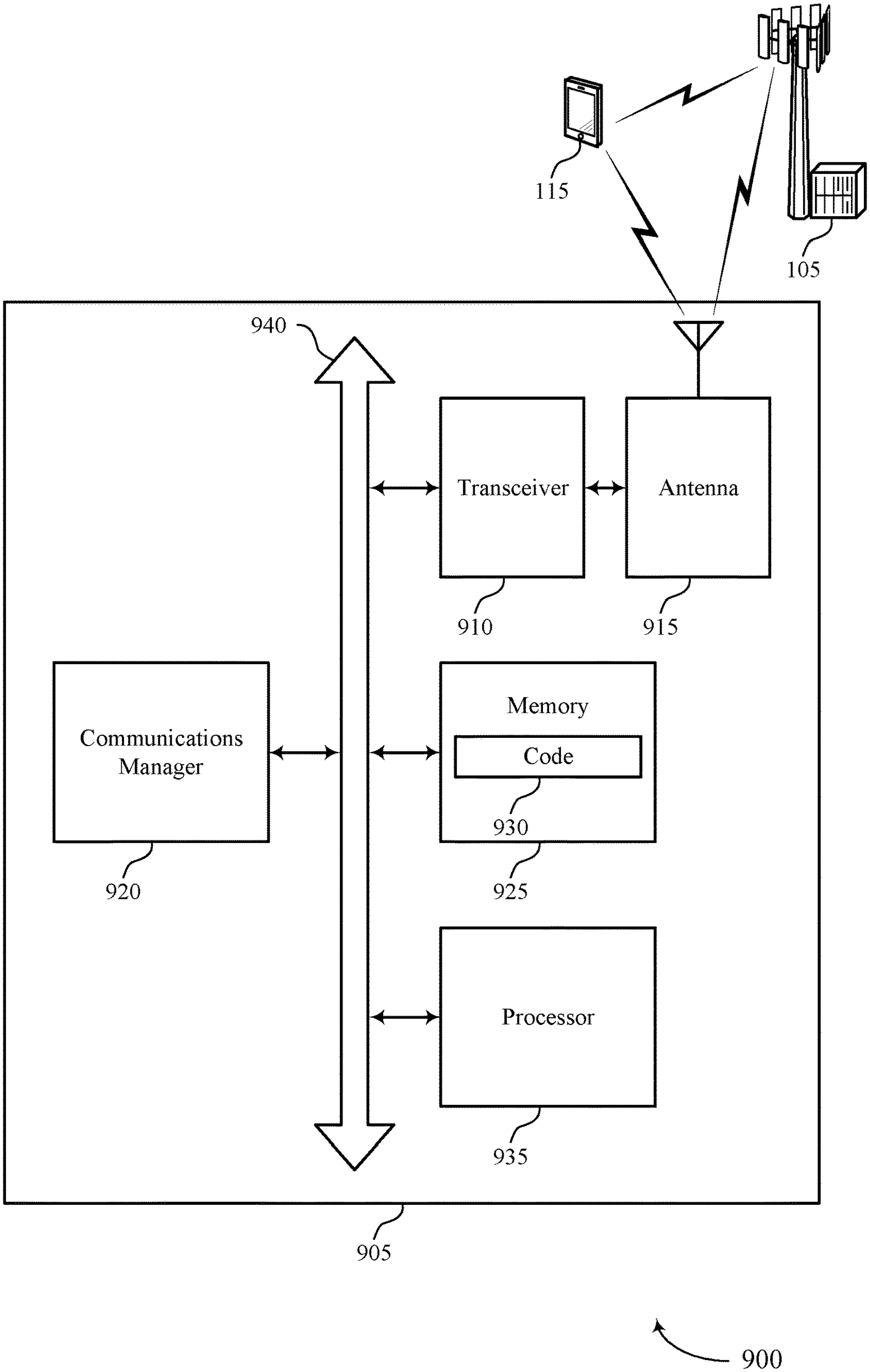
FIG. 9 shows a diagram of a system including a device that supports RAN sharing using a transparent proxy function in accordance with one or more aspects of the present disclosure.

FIG. 9 shows a diagram of a system 900 including a device 905 that supports radio access network sharing using a transparent proxy function in accordance with one or more aspects of the present disclosure. The device 905 may be an example of or include the components of a device 605, a device 705, or an AMF proxy as described herein. The device 905 may include components for bi-directional voice and data communications including components for transmitting and receiving communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

In some cases, the device 905 may include a single antenna 915. However, in some other cases, the device 905 may have more than one antenna 915, which may be capable of concurrently transmitting or receiving multiple wireless transmissions. The transceiver 910 may communicate bi-directionally, via the one or more antennas 915, wired, or wireless links as described herein. For example, the transceiver 910 may represent a wireless transceiver and may communicate bi-directionally with another wireless transceiver. The transceiver 910 may also include a modem to modulate the packets, to provide the modulated packets to one or more antennas 915 for transmission, and to demodulate packets received from the one or more antennas 915. The transceiver 910, or the transceiver 910 and one or more antennas 915, may be an example of a transmitter 615, a transmitter 715, a receiver 610, a receiver 710, or any combination thereof or component thereof, as described herein.

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 925) to cause the device 905 to perform various functions (e.g., functions or tasks supporting radio access network sharing using a transparent proxy function). For example, the device 905 or a component of the device 905 may include a processor 935 and memory 925 coupled with or to the processor 935, the processor 935 and memory 925 configured to perform various functions described herein.

The communications manager 920 may support wireless communications at an access and mobility management function (AMF) proxy in accordance with examples as disclosed herein. For example, the communications manager 920 is capable of, configured to, or operable to support a means for establishing a first communication link between the AMF proxy and a first radio access network associated with a first network operator, a second communication link between the AMF proxy and a first AMF associated with the first network operator, and a third communication link between the AMF proxy and a second AMF associated with a second network operator. The communications manager 920 is capable of, configured to, or operable to support a means for receiving, from the first radio access network via the first communication link, a message including a source identifier associated with a network entity of the first radio access network and including a target AMF identifier. The communications manager 920 is capable of, configured to, or operable to support a means for transmitting the message to the first AMF via the second communication link based on the target AMF identifier corresponding to the first AMF or transmitting the message to the second AMF via the third communication link based on the target AMF identifier corresponding to the second AMF.

By including or configuring the communications manager 920 in accordance with examples as described herein, the device 905 may support techniques for using an AMF proxy to communicate with multiple network operators for improved communication reliability, reduced latency, improved user experience related to reduced processing, reduced power consumption, more efficient utilization of communication resources, and improved coordination between devices.

In some examples, the communications manager 920 may be configured to perform various operations (e.g., receiving, monitoring, transmitting) using or otherwise in cooperation with the transceiver 910, the one or more antennas 915, or any combination thereof. Although the communications manager 920 is illustrated as a separate component, in some examples, one or more functions described with reference to the communications manager 920 may be supported by or performed by the processor 935, the memory 925, the code 930, or any combination thereof. For example, the code 930 may include instructions executable by the processor 935 to cause the device 905 to perform various aspects of radio access network sharing using a transparent proxy function as described herein, or the processor 935 and the memory 925 may be otherwise configured to perform or support such operations.

Figure 10:
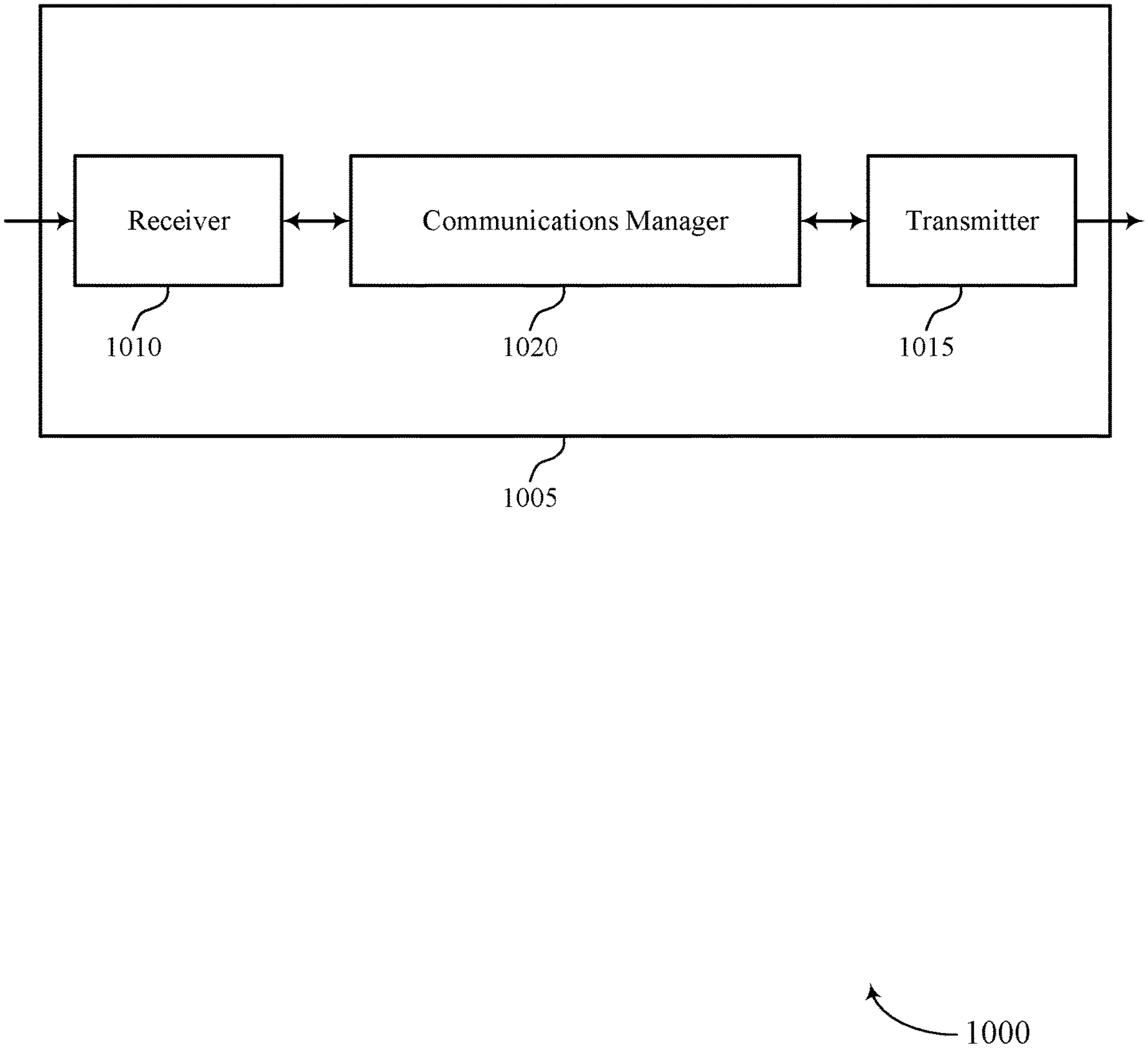
FIGS. 10 and 11 show block diagrams of devices that support RAN sharing using a transparent proxy function in accordance with one or more aspects of the present disclosure.

FIG. 10 shows a block diagram 1000 of a device 1005 that supports RAN sharing using a transparent proxy function in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of RAN sharing using a transparent proxy function as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first RAN in accordance with examples as disclosed herein. For example, the communications manager 1020 is capable of, configured to, or operable to support a means for establishing a communication link between an AMF proxy and the first RAN associated with a first network operator for communications with a first AMF associated with the first network operator or for communications with a second AMF associated with a second network operator. The communications manager 1020 is capable of, configured to, or operable to support a means for transmitting, to the AMF proxy via the communication link, a message including a source ID associated with a network entity of the first RAN and including a target AMF ID, where the message is for the first AMF or the second AMF based on the target AMF ID.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing and, reduced power consumption, more efficient utilization of communication resources.

Figure 11:
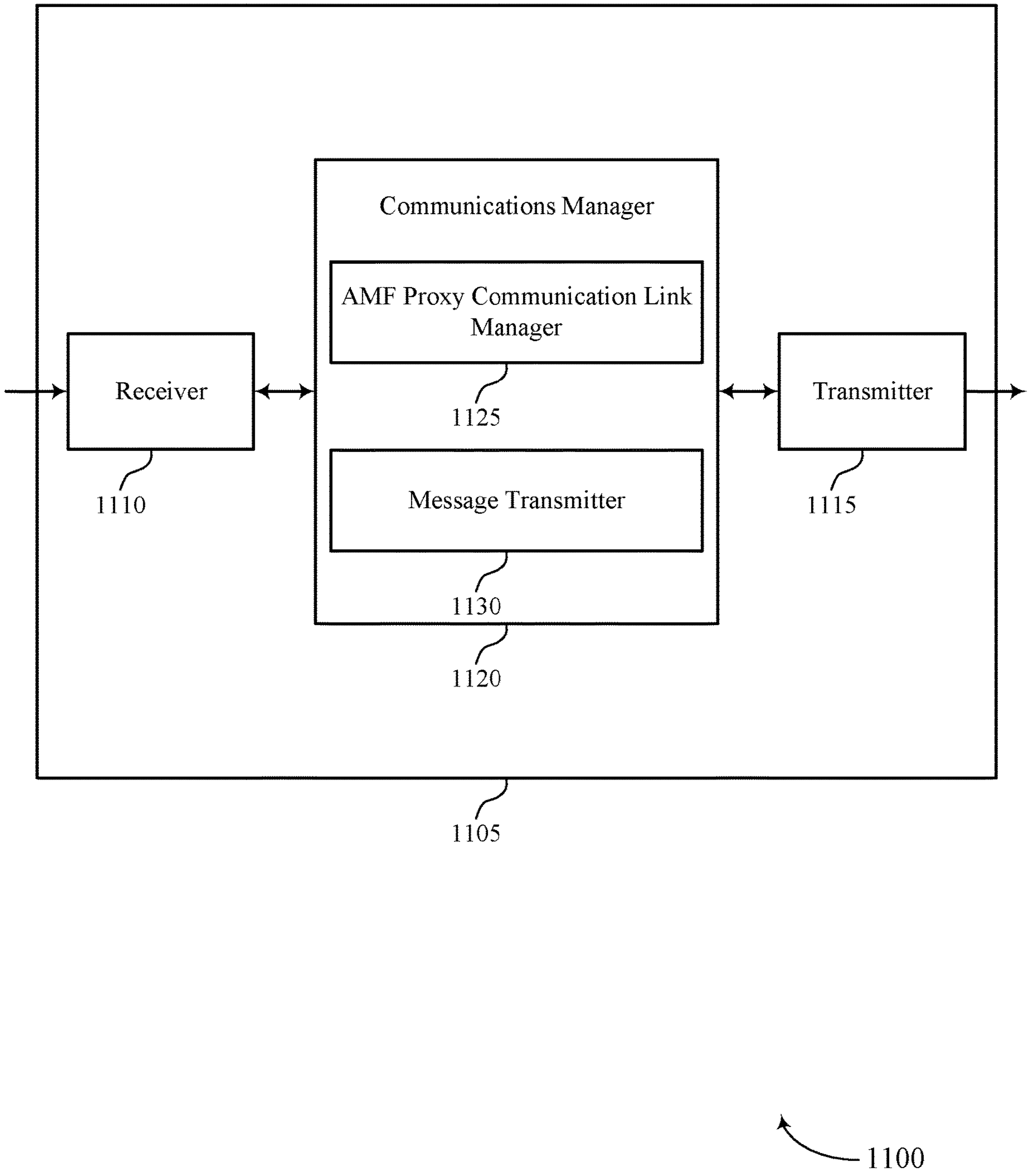

FIG. 11 shows a block diagram 1100 of a device 1105 that supports RAN sharing using a transparent proxy function in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of RAN sharing using a transparent proxy function as described herein. For example, the communications manager 1120 may include an AMF proxy communication link manager 1125 a message transmitter 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a first RAN in accordance with examples as disclosed herein. The AMF proxy communication link manager 1125 is capable of, configured to, or operable to support a means for establishing a communication link between an AMF proxy and the first RAN associated with a first network operator for communications with a first AMF associated with the first network operator or for communications with a second AMF associated with a second network operator. The message transmitter 1130 is capable of, configured to, or operable to support a means for transmitting, to the AMF proxy via the communication link, a message including a source ID associated with a network entity of the first RAN and including a target AMF ID, where the message is for the first AMF or the second AMF based on the target AMF ID.

Figure 12:
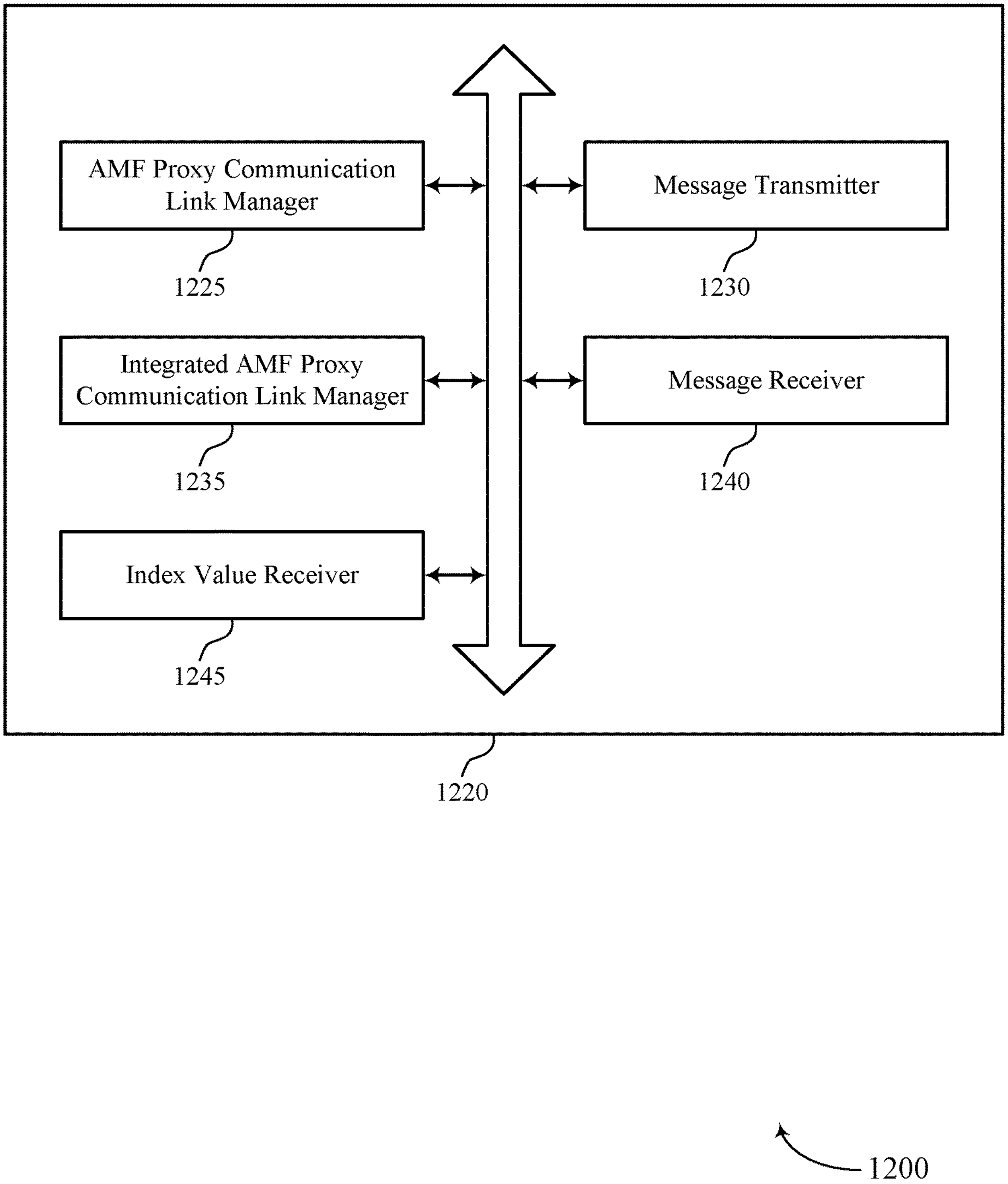
FIG. 12 shows a block diagram of a communications manager that supports RAN sharing using a transparent proxy function in accordance with one or more aspects of the present disclosure.

FIG. 12 shows a block diagram 1200 of a communications manager 1220 that supports RAN sharing using a transparent proxy function in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of RAN sharing using a transparent proxy function as described herein. For example, the communications manager 1220 may include an AMF proxy communication link manager 1225, a message transmitter 1230, an integrated AMF proxy communication link manager 1235, a message receiver 1240, an index value receiver 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a first RAN in accordance with examples as disclosed herein. The AMF proxy communication link manager 1225 is capable of, configured to, or operable to support a means for establishing a communication link between an AMF proxy and the first RAN associated with a first network operator for communications with a first AMF associated with the first network operator or for communications with a second AMF associated with a second network operator. The message transmitter 1230 is capable of, configured to, or operable to support a means for transmitting, to the AMF proxy via the communication link, a message including a source ID associated with a network entity of the first RAN and including a target AMF ID, where the message is for the first AMF or the second AMF based on the target AMF ID.

In some examples, the integrated AMF proxy communication link manager 1235 is capable of, configured to, or operable to support a means for establishing the communication link directly between the first RAN associated with the first network operator and the first AMF associated with the first network operator and. In some examples, the message transmitter 1230 is capable of, configured to, or operable to support a means for transmitting the message, to the first AMF via the communication link, based on the first AMF acting as the AMF proxy.

In some examples, the first RAN is included in a set of multiple RANs and the communication link is included in a set of multiple communication links between the set of multiple RANs and the AMF proxy.

12In some examples, to support transmitting the message to the AMF proxy via the communication link, the message transmitter 1230 is capable of, configured to, or operable to support a means for transmitting the message including the source ID and the target AMF ID as part of a routing information element in the message.

In some examples, the target AMF ID includes a public land mobile network (PLMN) ID.

In some examples, the message transmitter 1230 is capable of, configured to, or operable to support a means for transmitting a second message to the AMF proxy via the communication link, the second message including the source ID and the target AMF ID including a corresponding PLMN ID. In some examples, the index value receiver 1245 is capable of, configured to, or operable to support a means for receiving, from the AMF proxy, an index value for the target AMF ID based on the target AMF ID and the corresponding PLMN ID. In some examples, the message transmitter 1230 is capable of, configured to, or operable to support a means for transmitting a third message to the AMF proxy via the communication link, the second message including the source ID, the index value for the target AMF ID, and the corresponding PLMN ID In some examples, the message receiver 1240 is capable of, configured to, or operable to support a means for receiving a second message from the AMF proxy via the communication link, the second message including a source AMF ID and a target RAN ID, where the source AMF ID is associated with the first AMF or the second AMF and the target RAN ID is associated with the first RAN.

In some examples, to support receiving the second message from the AMF proxy via the communication link, the message receiver 1240 is capable of, configured to, or operable to support a means for receive the second message including the source identifier and the target AMF identifier as part of a routing information element in the second message.

Figure 13:
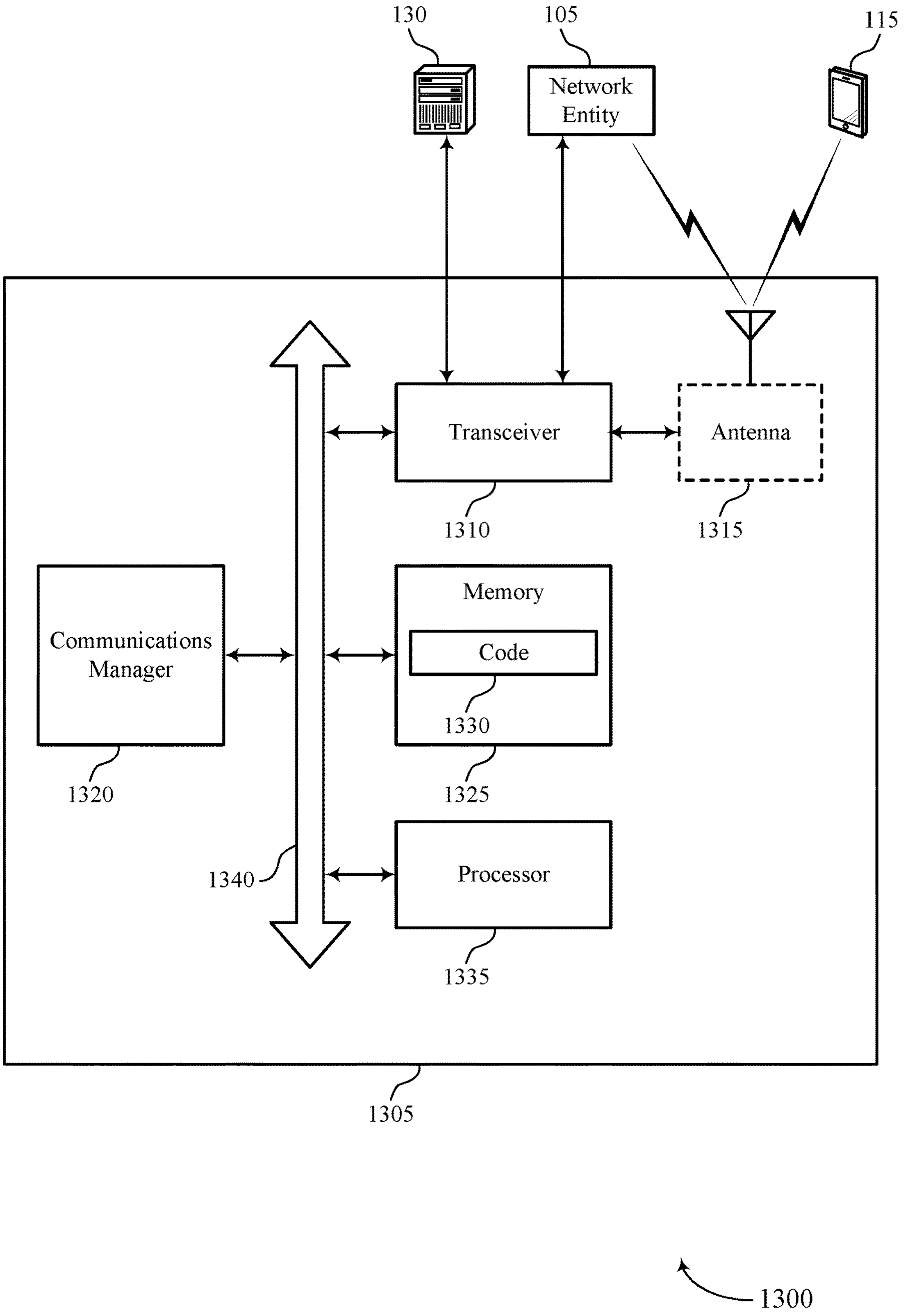
FIG. 13 shows a diagram of a system including a device that supports RAN sharing using a transparent proxy function in accordance with one or more aspects of the present disclosure.

FIG. 13 shows a diagram of a system 1300 including a device 1305 that supports RAN sharing using a transparent proxy function in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting RAN sharing using a transparent proxy function). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a first RAN in accordance with examples as disclosed herein. For example, the communications manager 1320 is capable of, configured to, or operable to support a means for establishing a communication link between an AMF proxy and the first RAN associated with a first network operator for communications with a first AMF associated with the first network operator or for communications with a second AMF associated with a second network operator. The communications manager 1320 is capable of, configured to, or operable to support a means for transmitting, to the AMF proxy via the communication link, a message including a source ID associated with a network entity of the first RAN and including a target AMF ID, where the message is for the first AMF or the second AMF based on the target AMF ID.

By including or configuring the communications manager 1320 in accordance with examples as described herein, the device 1305 may support techniques for improved communication reliability, reduced latency, improved user experience related to reduced processing, reduced power consumption, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of RAN sharing using a transparent proxy function as described herein, or the processor 1335 and the memory 1325 may be otherwise configured to perform or support such operations.

Figure 14:
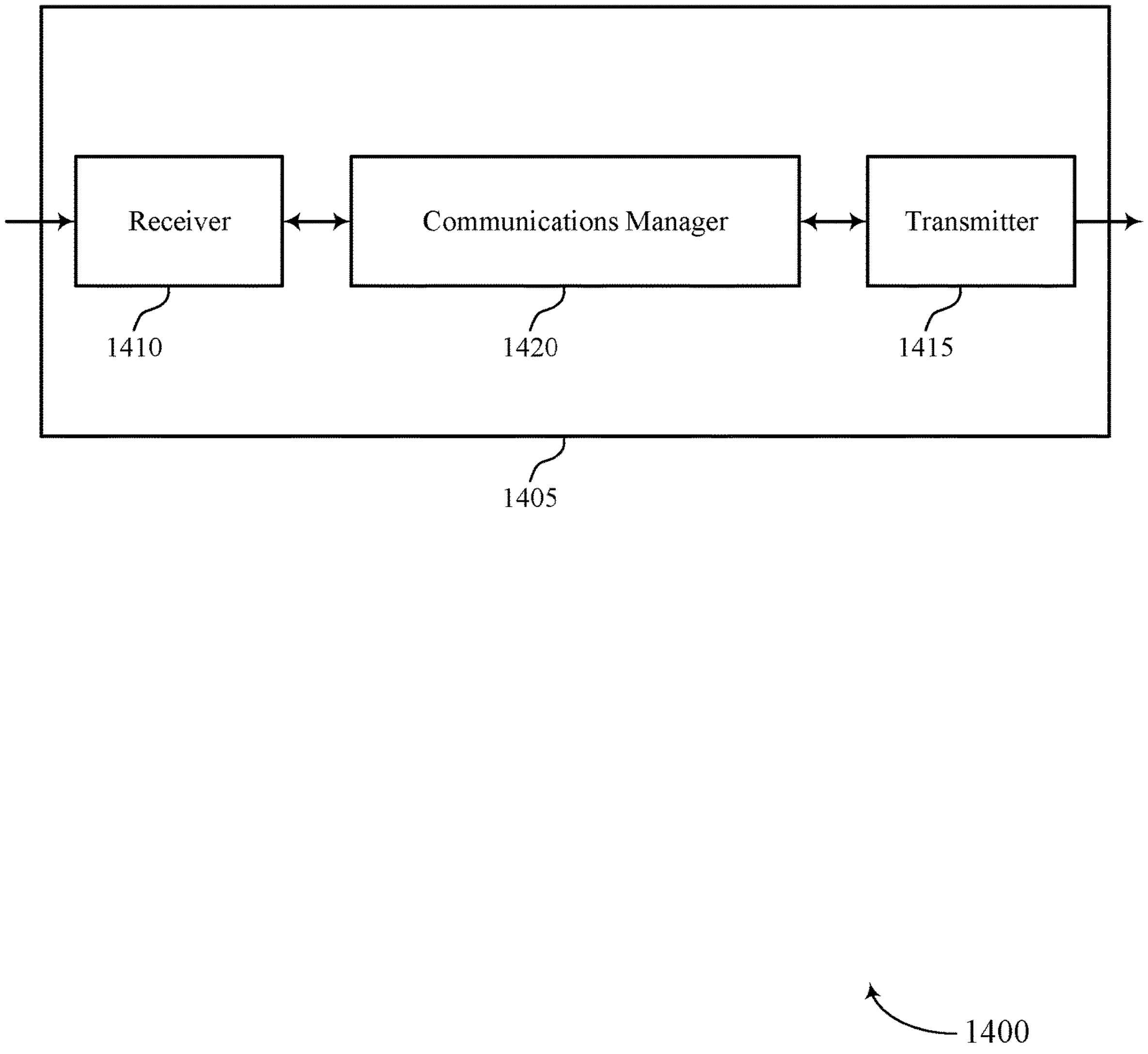
FIGS. 14 and 15 show block diagrams of devices that support RAN sharing using a transparent proxy function in accordance with one or more aspects of the present disclosure.

FIG. 14 shows a block diagram 1400 of a device 1405 that supports RAN sharing using a transparent proxy function in accordance with one or more aspects of the present disclosure. The device 1405 may be an example of aspects of an AMF as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to RAN sharing using a transparent proxy function). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to RAN sharing using a transparent proxy function). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of RAN sharing using a transparent proxy function as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at an AMF in accordance with examples as disclosed herein. For example, the communications manager 1420 is capable of, configured to, or operable to support a means for establishing a communication link between an AMF proxy and the AMF. The communications manager 1420 is capable of, configured to, or operable to support a means for receiving, from the AMF proxy via the communication link, a message including a source ID associated with a network entity of a first RAN associated with a first network operator and including a target AMF ID associated with the AMF. The communications manager 1420 is capable of, configured to, or operable to support a means for decoding the message from the AMF proxy based on the target AMF ID being associated with the AMF.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for reduced processing, reduced power consumption, more efficient utilization of communication resources.

Figure 15:
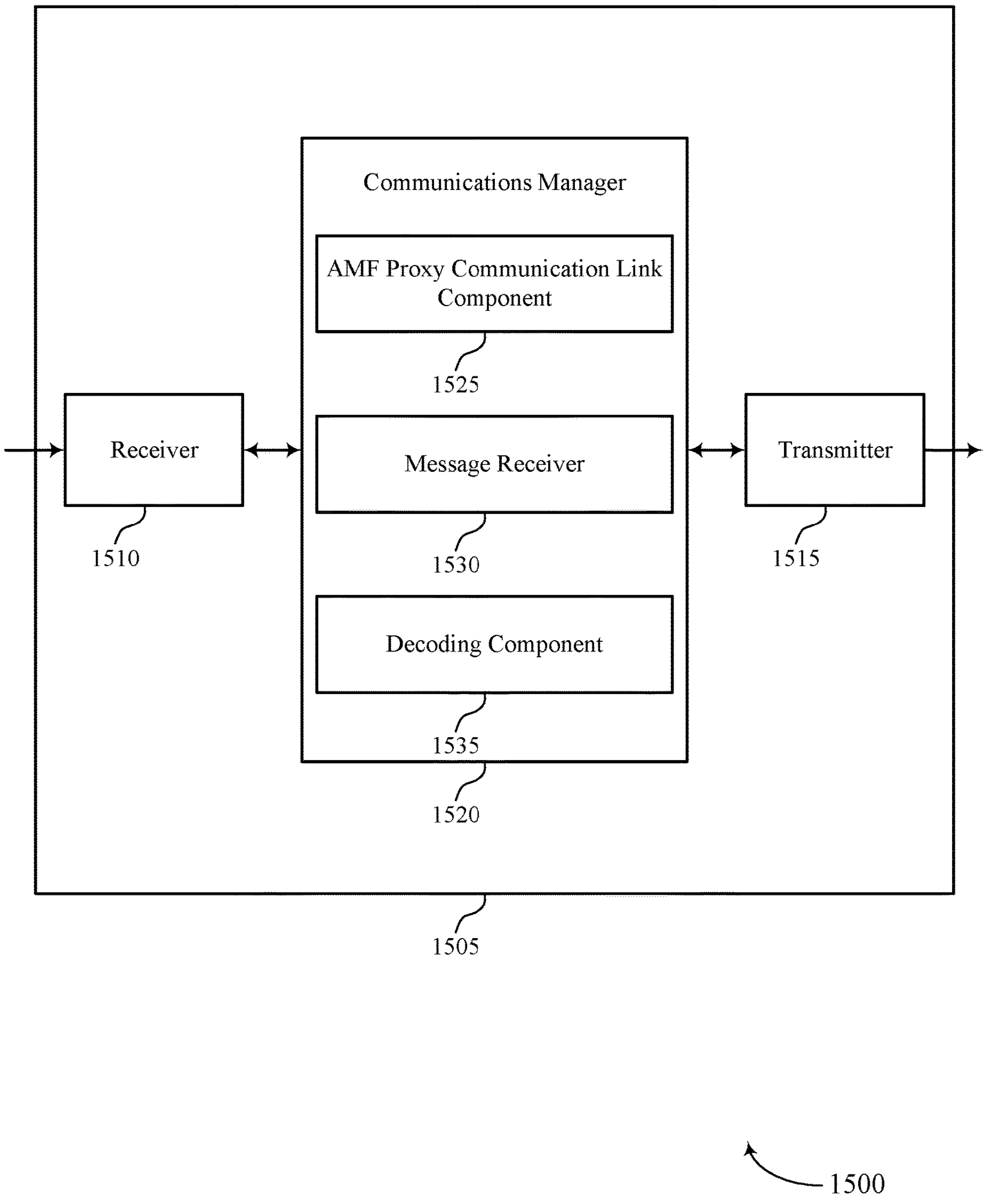

FIG. 15 shows a block diagram 1500 of a device 1505 that supports RAN sharing using a transparent proxy function in accordance with one or more aspects of the present disclosure. The device 1505 may be an example of aspects of a device 1405 or an AMF as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to RAN sharing using a transparent proxy function). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to RAN sharing using a transparent proxy function). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of RAN sharing using a transparent proxy function as described herein. For example, the communications manager 1520 may include an AMF proxy communication link component 1525, a message receiver 1530, a decoding component 1535, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at an AMF in accordance with examples as disclosed herein. The AMF proxy communication link component 1525 is capable of, configured to, or operable to support a means for establishing a communication link between an AMF proxy and the AMF. The message receiver 1530 is capable of, configured to, or operable to support a means for receiving, from the AMF proxy via the communication link, a message including a source ID associated with a network entity of a first RAN associated with a first network operator and including a target AMF ID associated with the AMF. The decoding component 1535 is capable of, configured to, or operable to support a means for decoding the message from the AMF proxy based on the target AMF ID being associated with the AMF.

Figure 16:
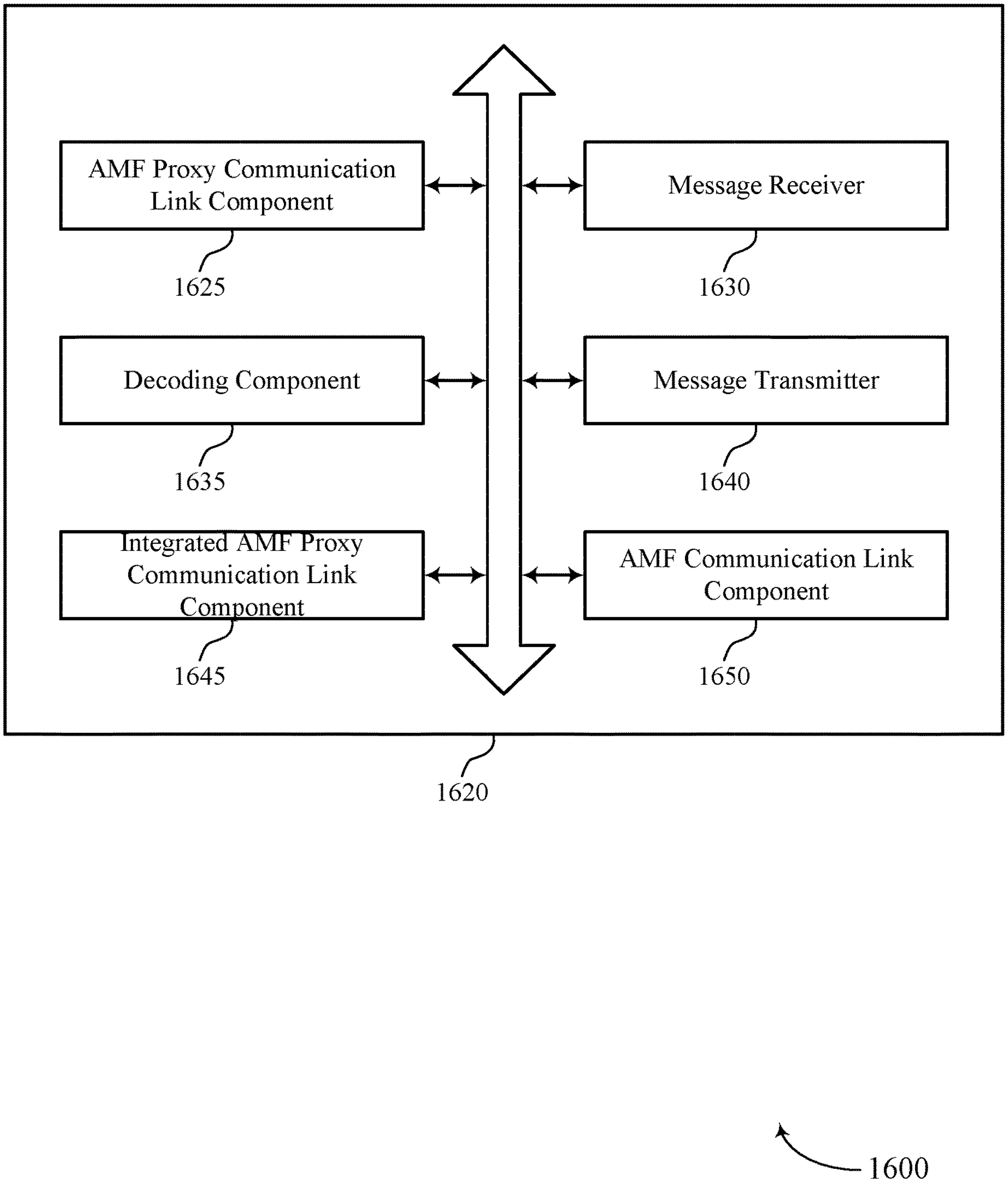
FIG. 16 shows a block diagram of a communications manager that supports RAN sharing using a transparent proxy function in accordance with one or more aspects of the present disclosure.

FIG. 16 shows a block diagram 1600 of a communications manager 1620 that supports RAN sharing using a transparent proxy function in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of RAN sharing using a transparent proxy function as described herein. For example, the communications manager 1620 may include an AMF proxy communication link component 1625, a message receiver 1630, a decoding component 1635, a message transmitter 1640, an integrated AMF proxy communication link component 1645, an AMF communication link component 1650, or any combination thereof. Each of these components may communicate, directly or indirectly, with one another (e.g., via one or more buses).

The communications manager 1620 may support wireless communications at an AMF in accordance with examples as disclosed herein. The AMF proxy communication link component 1625 is capable of, configured to, or operable to support a means for establishing a communication link between an AMF proxy and the AMF. The message receiver 1630 is capable of, configured to, or operable to support a means for receiving, from the AMF proxy via the communication link, a message including a source ID associated with a network entity of a first RAN associated with a first network operator and including a target AMF ID associated with the AMF. The decoding component 1635 is capable of, configured to, or operable to support a means for decoding the message from the AMF proxy based on the target AMF ID being associated with the AMF.

In some examples, the AMF is associated with the first network operator or a second network operator.

In some examples, if the AMF is associated with the first network operator, and the integrated AMF proxy communication link component 1645 is capable of, configured to, or operable to support a means for establishing a first communication link directly between the first RAN and the AMF. In some examples, if the AMF is associated with the first network operator and the first communication link directly between the first RAN and the AMF, the AMF communication link component 1645 is capable of, configured to, or operable to support a means for establishing a second communication link between the AMF and a different AMF associated with the second network operator based on the AMF acting as the AMF proxy. In some examples, if the AMF is associated with the first network operator, and the message receiver 1630 is capable of, configured to, or operable to support a means for receiving the message from the network entity of the first RAN associated with the first network operator including the source ID and the target AMF ID.

In some examples, the decoding component 1635 is capable of, configured to, or operable to support a means for refraining from decoding the message from the network entity of the first RAN. In some examples, the message transmitter 1640 is capable of, configured to, or operable to support a means for transmitting the message from the network entity of the first RAN to the different AMF associated with the second network operator based on the target AMF ID of the message being associated with the different AMF associated with the second network operator.

In some examples, the message receiver 1630 is capable of, configured to, or operable to support a means for receiving a multiplexed message from the AMF proxy, where the multiplexed message includes one or more messages that have a same target AMF ID. In some examples, the decoding component 1635 is capable of, configured to, or operable to support a means for decoding the one or more messages received via the multiplexed message.

In some examples, to support receiving the message from the network entity of the first radio access network, the message receiver 1630 is capable of, configured to, or operable to support a means for receiving the message including the source identifier and the target AMF identifier as part of a routing information element in the message.

In some examples, the target AMF identifier includes a PLMN identifier.

In some examples, the message transmitter 1640 is capable of, configured to, or operable to support a means for transmitting a second message to the AMF proxy via the communication link, the second message including the source AMF ID and a target RAN ID, where the source AMF ID is associated with the AMF and the target RAN ID is associated with the first RAN.

In some examples, to support receiving the second message to the first RAN, the message transmitter 1640 is capable of, configured to, or operable to support a means for transmitting the second message including the source AMF identifier and the target RAN ID as part of a routing information element in the message.

Figure 17:
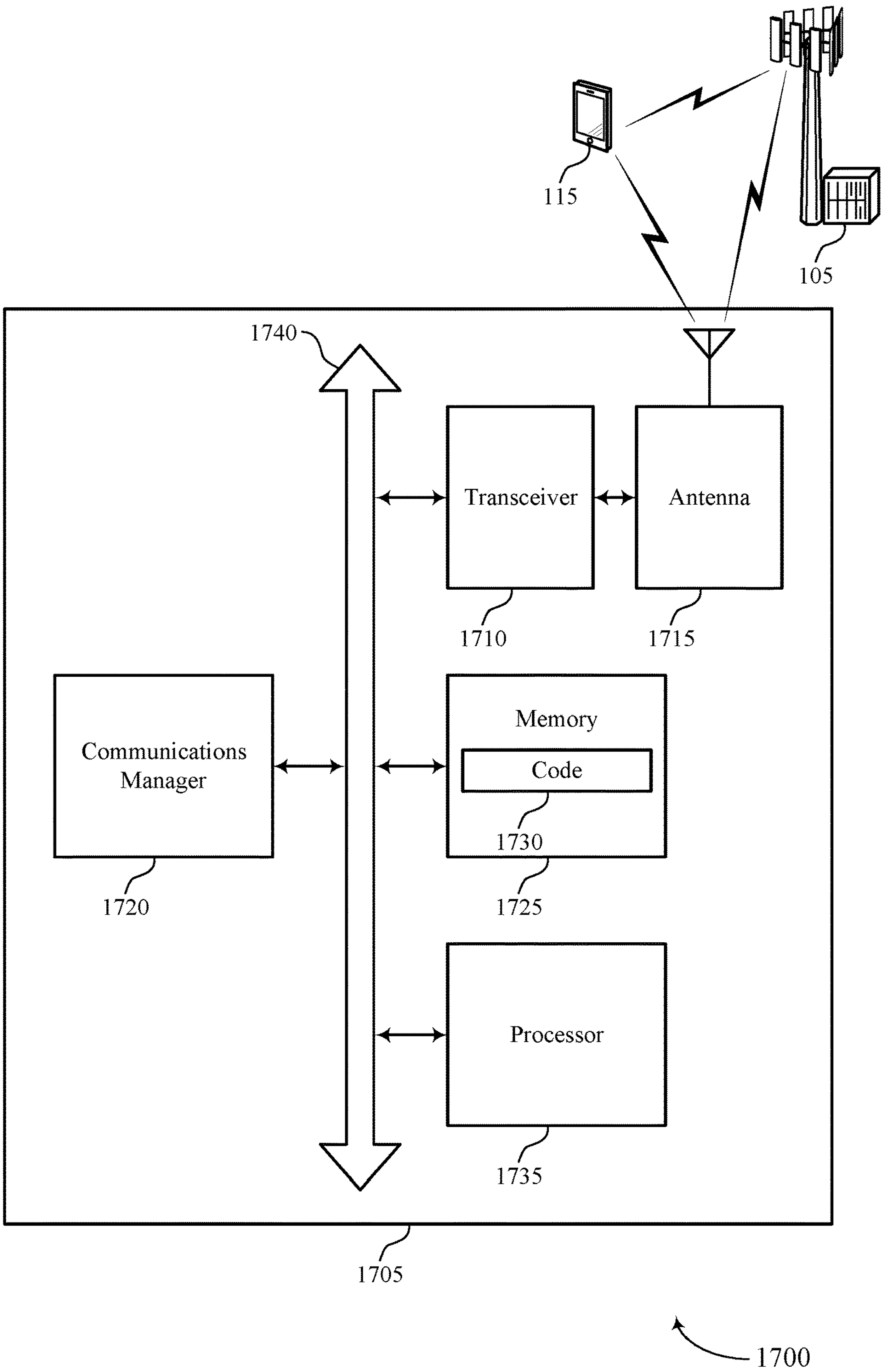
FIG. 17 shows a diagram of a system including a device that supports RAN sharing using a transparent proxy function in accordance with one or more aspects of the present disclosure.

FIG. 17 shows a diagram of a system 1700 including a device 1705 that supports radio access network sharing using a transparent proxy function in accordance with one or more aspects of the present disclosure. The device 1705 may be an example of or include the components of a device 1405, a device 1505, or an AMF as described herein. The device 1705 may include components for bi-directional voice and data communications including components for transmitting and receiving communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

In some cases, the device 1705 may include a single antenna 1715. However, in some other cases, the device 1705 may have more than one antenna 1715, which may be capable of concurrently transmitting or receiving multiple wireless transmissions. The transceiver 1710 may communicate bi-directionally, via the one or more antennas 1715, wired, or wireless links as described herein. For example, the transceiver 1710 may represent a wireless transceiver and may communicate bi-directionally with another wireless transceiver. The transceiver 1710 may also include a modem to modulate the packets, to provide the modulated packets to one or more antennas 1715 for transmission, and to demodulate packets received from the one or more antennas 1715. The transceiver 1710, or the transceiver 1710 and one or more antennas 1715, may be an example of a transmitter 1415, a transmitter 1515, a receiver 1410, a receiver 1510, or any combination thereof or component thereof, as described herein.

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting radio access network sharing using a transparent proxy function). For example, the device 1705 or a component of the device 1705 may include a processor 1735 and memory 1725 coupled with or to the processor 1735, the processor 1735 and memory 1725 configured to perform various functions described herein.

The communications manager 1720 may support wireless communications at an access and mobility function (AMF) in accordance with examples as disclosed herein. For example, the communications manager 1720 is capable of, configured to, or operable to support a means for establishing a communication link between an access and mobility management function (AMF) proxy and the AMF. The communications manager 1720 is capable of, configured to, or operable to support a means for receiving, from the AMF proxy via the communication link, a message including a source identifier associated with a network entity of a first radio access network associated with a first network operator and including a target AMF identifier associated with the AMF. The communications manager 1720 is capable of, configured to, or operable to support a means for decoding the message from the AMF proxy based on the target AMF identifier being associated with the AMF.

By including or configuring the communications manager 1720 in accordance with examples as described herein, the device 1705 may support techniques for improved communication reliability, reduced latency, improved user experience related to reduced processing, reduced power consumption, more efficient utilization of communication resources, and improved coordination between devices.

In some examples, the communications manager 1720 may be configured to perform various operations (e.g., receiving, monitoring, transmitting) using or otherwise in cooperation with the transceiver 1710, the one or more antennas 1715, or any combination thereof. Although the communications manager 1720 is illustrated as a separate component, in some examples, one or more functions described with reference to the communications manager 1720 may be supported by or performed by the processor 1735, the memory 1725, the code 1730, or any combination thereof. For example, the code 1730 may include instructions executable by the processor 1735 to cause the device 1705 to perform various aspects of radio access network sharing using a transparent proxy function as described herein, or the processor 1735 and the memory 1725 may be otherwise configured to perform or support such operations.

FIG. 18 shows a flowchart illustrating a method 1800 that supports RAN sharing using a transparent proxy function in accordance with aspects of the present disclosure. The operations of the method 1800 may be implemented by an AMF proxy or its components as described herein. For example, the operations of the method 1800 may be performed by an AMF proxy as described with reference to FIGS. 1 through 9. In some examples, an AMF proxy may execute a set of instructions to control the functional elements of the AMF proxy to perform the described functions. Additionally, or alternatively, the AMF proxy may perform aspects of the described functions using special-purpose hardware.

At 1805, the method may include establishing a first communication link between the AMF proxy and a first RAN associated with a first network operator, a second communication link between the AMF proxy and a first AMF associated with the first network operator, and a third communication link between the AMF proxy and a second AMF associated with a second network operator. The operations of block 1805 may be performed in accordance with examples as disclosed herein. In some examples, aspects of the operations of 1805 may be performed by an AMF proxy communication link component 825 as described with reference to FIG. 8.

At 1810, the method may include receiving, from the first RAN via the first communication link, a message including a source ID associated with a network entity of the first RAN and including a target AMF ID. The operations of block 1810 may be performed in accordance with examples as disclosed herein. In some examples, aspects of the operations of 1810 may be performed by a message receiver 830 as described with reference to FIG. 8.

At 1815, the method may include transmitting the message to the first AMF via the second communication link based on the target AMF ID corresponding to the first AMF or transmitting the message to the second AMF via the third communication link based on the target AMF ID corresponding to the second AMF. The operations of block 1815 may be performed in accordance with examples as disclosed herein. In some examples, aspects of the operations of 1815 may be performed by a message transmitter 835 as described with reference to FIG. 8.

Figure 19:
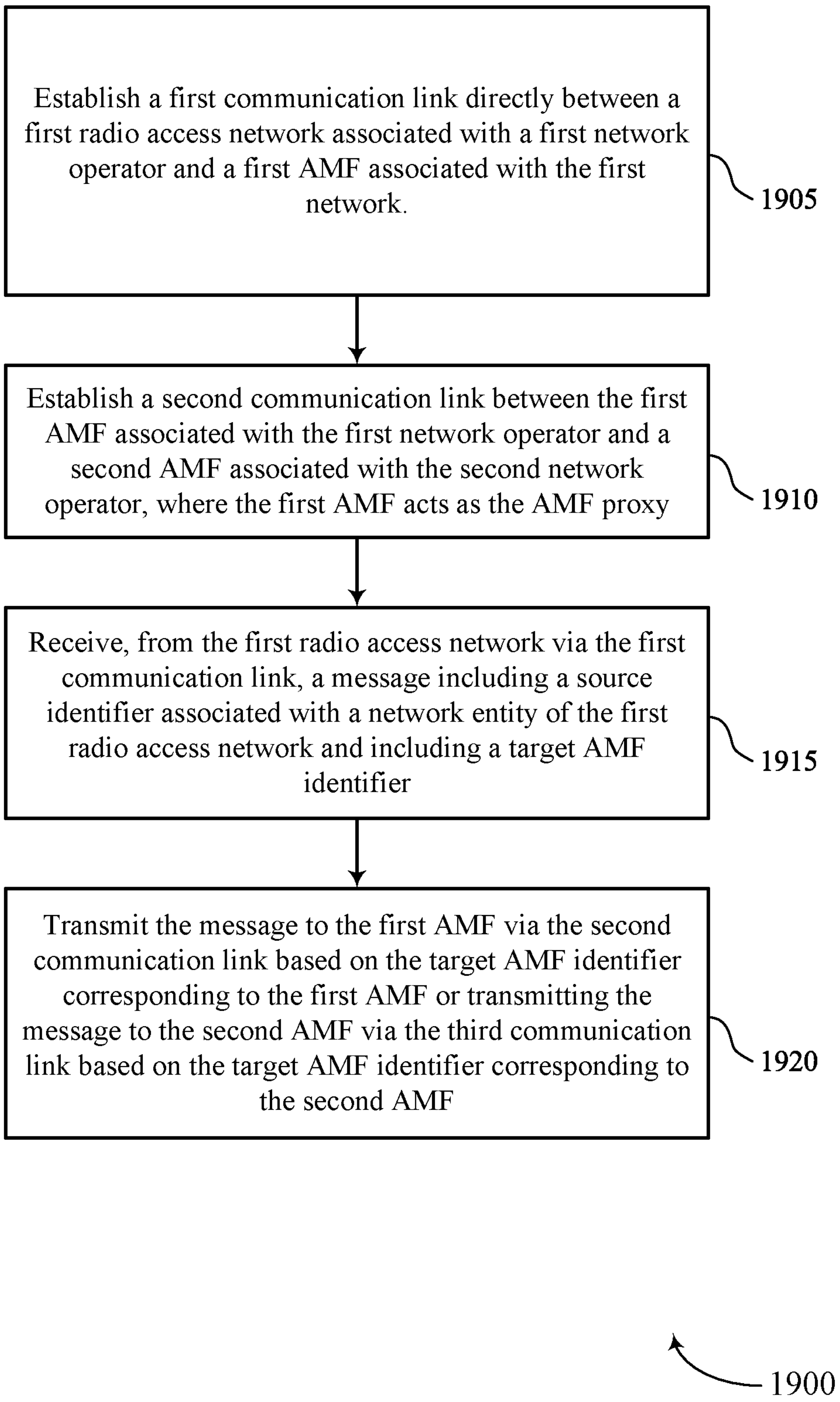

FIG. 19 shows a flowchart illustrating a method 1900 that supports RAN sharing using a transparent proxy function in accordance with aspects of the present disclosure. The operations of the method 1900 may be implemented by an AMF proxy or its components as described herein. For example, the operations of the method 1900 may be performed by an AMF proxy as described with reference to FIGS. 1 through 9. In some examples, an AMF proxy may execute a set of instructions to control the functional elements of the AMF proxy to perform the described functions. Additionally, or alternatively, the AMF proxy may perform aspects of the described functions using special-purpose hardware.

At 1905, the method may include establishing a first communication link directly between a first radio access network associated with a first network operator and a first AMF associated with the first network operator. The operations of block 1905 may be performed in accordance with examples as disclosed herein. In some examples, aspects of the operations of 1905 may be performed by integrated AMF proxy communication link component 840 as described with reference to FIG. 8.

At 1910, the method may include establishing a second communication link between the first AMF associated with the first network operator and a second AMF associated with the second network operator, where the first AMF acts as the AMF proxy. The operations of block 1910 may be performed in accordance with examples as disclosed herein. In some examples, aspects of the operations of 1910 may be performed by an integrated AMF proxy communication link component 840 as described with reference to FIG. 8.

At 1915, the method may include receiving, from the first RAN via the first communication link, a message including a source ID associated with a network entity of the first RAN and including a target AMF ID. The operations of block 1915 may be performed in accordance with examples as disclosed herein. In some examples, aspects of the operations of 1915 may be performed by a message receiver 830 as described with reference to FIG. 8.

At 1920, the method may include transmitting the message to the second AMF via the second communication link based on the target AMF ID corresponding to the second AMF. The operations of block 1920 may be performed in accordance with examples as disclosed herein. In some examples, aspects of the operations of 1920 may be performed by a message transmitter 835 as described with reference to FIG. 8.

FIG. 20 shows a flowchart illustrating a method 2000 that supports RAN sharing using a transparent proxy function in accordance with aspects of the present disclosure. The operations of the method 2000 may be implemented by an AMF proxy or its components as described herein. For example, the operations of the method 2000 may be performed by an AMF proxy as described with reference to FIGS. 1 through 9. In some examples, an AMF proxy may execute a set of instructions to control the functional elements of the AMF proxy to perform the described functions. Additionally, or alternatively, the AMF proxy may perform aspects of the described functions using special-purpose hardware.

At 2005, the method may include transmitting, as part of establishing a first communication link between a first RAN associated with a first network operator and a first AMF associated with the first network operator, a first message to the first RAN, the second message indicating support for establishing a communication link with an AMF of a network operator that is different than the first network operator. The operations of block 2005 may be performed in accordance with examples as disclosed herein. In some examples, aspects of the operations of 2005 may be performed by a message transmitter 835 as described with reference to FIG. 8.

At 2010, the method may include establishing a second communication link between the first AMF and a second AMF associated with a second network operator based on the first AMF acting as the AMF proxy and on the first message. The operations of block 2010 may be performed in accordance with examples as disclosed herein. In some examples, aspects of the operations of 2010 may be performed by an AMF communication link component 845 as described with reference to FIG. 8.

At 2015, the method may include receiving, from the first RAN via the first communication link, a second message including a source ID associated with a network entity of the first RAN and including a target AMF ID. The operations of block 2015 may be performed in accordance with examples as disclosed herein. In some examples, aspects of the operations of 2015 may be performed by a message receiver 830 as described with reference to FIG. 8.

At 2020, the method may include transmitting the message to the second AMF via the second communication link based on the target AMF ID corresponding to the second AMF. The operations of block 2020 may be performed in accordance with examples as disclosed herein. In some examples, aspects of the operations of 2020 may be performed by a message transmitter 835 as described with reference to FIG. 8.

Figure 21:
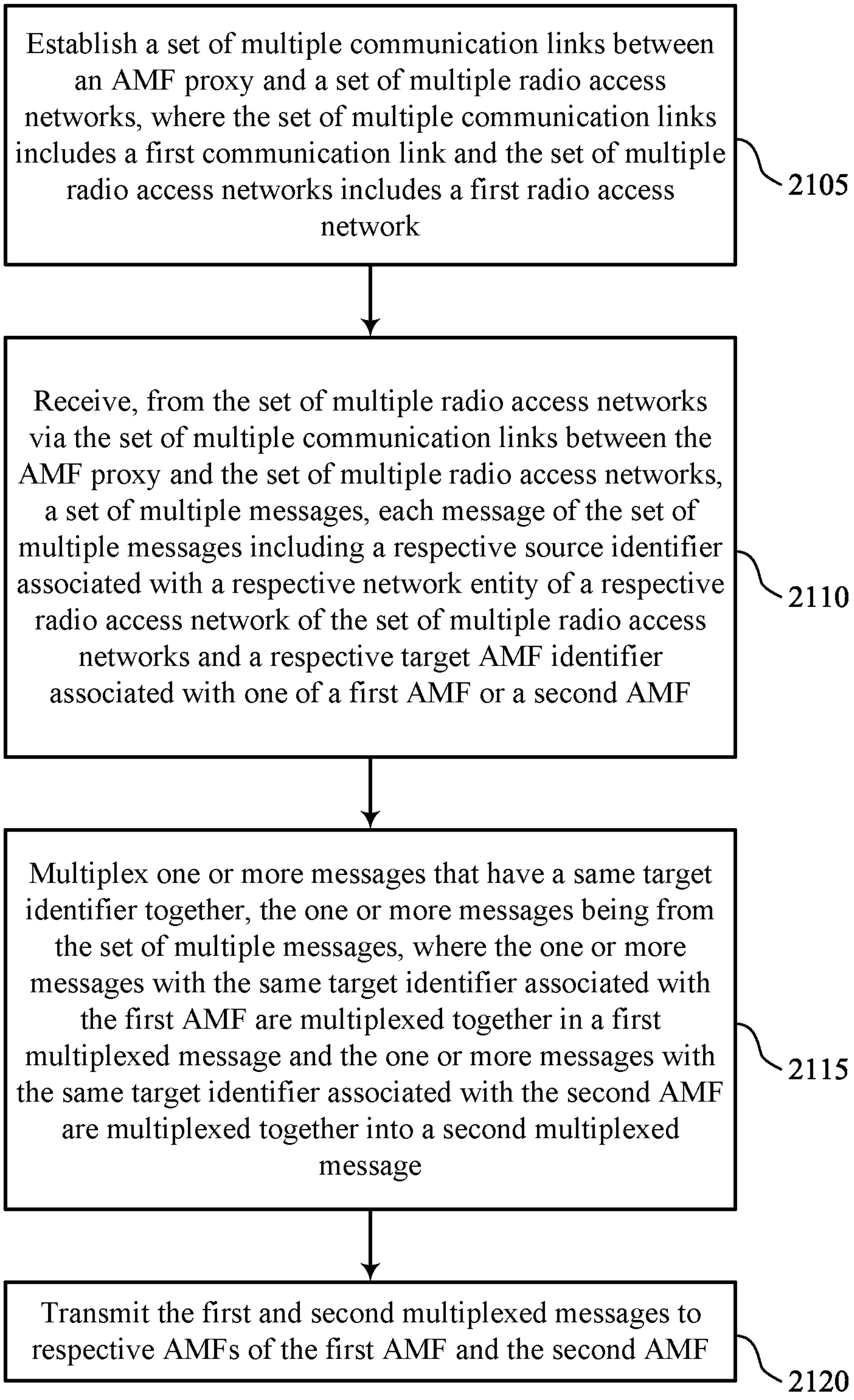

FIG. 21 shows a flowchart illustrating a method 2100 that supports RAN sharing using a transparent proxy function in accordance with aspects of the present disclosure. The operations of the method 2100 may be implemented by an AMF proxy or its components as described herein. For example, the operations of the method 2100 may be performed by an AMF proxy as described with reference to FIGS. 1 through 9. In some examples, an AMF proxy may execute a set of instructions to control the functional elements of the AMF proxy to perform the described functions. Additionally, or alternatively, the AMF proxy may perform aspects of the described functions using special-purpose hardware.

At 2105, the method may include establishing a set of multiple communication links between an AMF proxy and a set of multiple RANs, where the set of multiple communication links includes a first communication link and the set of multiple RANs includes a first radio access network. The operations of block 2105 may be performed in accordance with examples as disclosed herein. In some examples, aspects of the operations of 2105 may be performed by an AMF proxy communication link component 825 as described with reference to FIG. 8.

At 2110, the method may include receiving, from the set of multiple RANs via the set of multiple communication links between the AMF proxy and the set of multiple RANs, a set of multiple messages, each message of the set of multiple messages including a respective source ID associated with a respective network entity of a respective RAN of the set of multiple RANs and a respective target AMF ID associated with one of a first AMF or a second AMF. The operations of block 2110 may be performed in accordance with examples as disclosed herein. In some examples, aspects of the operations of 2110 may be performed by a message receiver 830 as described with reference to FIG. 8.

At 2115, the method may include multiplexing one or more messages that have a same target ID together, the one or more messages being from the set of multiple messages, where the one or more messages with the same target ID associated with the first AMF are multiplexed together in a first multiplexed message and the one or more messages with the same target ID associated with the second AMF are multiplexed together into a second multiplexed message. The operations of block 2115 may be performed in accordance with examples as disclosed herein. In some examples, aspects of the operations of 2115 may be performed by a multiplexing component 850 as described with reference to FIG. 8.

At 2120, the method may include transmitting the first and second multiplexed messages to respective AMFs of the first AMF and the second AMF. The operations of block 2120 may be performed in accordance with examples as disclosed herein. In some examples, aspects of the operations of 2120 may be performed by a multiplexed message component 855 as described with reference to FIG. 8.

FIG. 22 shows a flowchart illustrating a method 2200 that supports radio access network sharing using a transparent proxy function in accordance with aspects of the present disclosure. The operations of the method 2200 may be implemented by a network entity or its components as described herein. For example, the operations of the method 2200 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2205, the method may include establishing a communication link between an AMF proxy and the first radio access network associated with a first network operator for communications with a first AMF associated with the first network operator or for communications with a second AMF associated with a second network operator. The operations of block 2205 may be performed in accordance with examples as disclosed herein. In some examples, aspects of the operations of 2205 may be performed by an AMF proxy communication link manager 1225 as described with reference to FIG. 12.

At 2210, the method may include transmitting, to the AMF proxy via the communication link, a message including a source ID associated with a network entity of the first radio access network and including a target AMF ID, where the message is for the first AMF or the second AMF based on the target AMF ID. The operations of block 2210 may be performed in accordance with examples as disclosed herein. In some examples, aspects of the operations of 2210 may be performed by a message transmitter 1230 as described with reference to FIG. 12.

Figure 23:
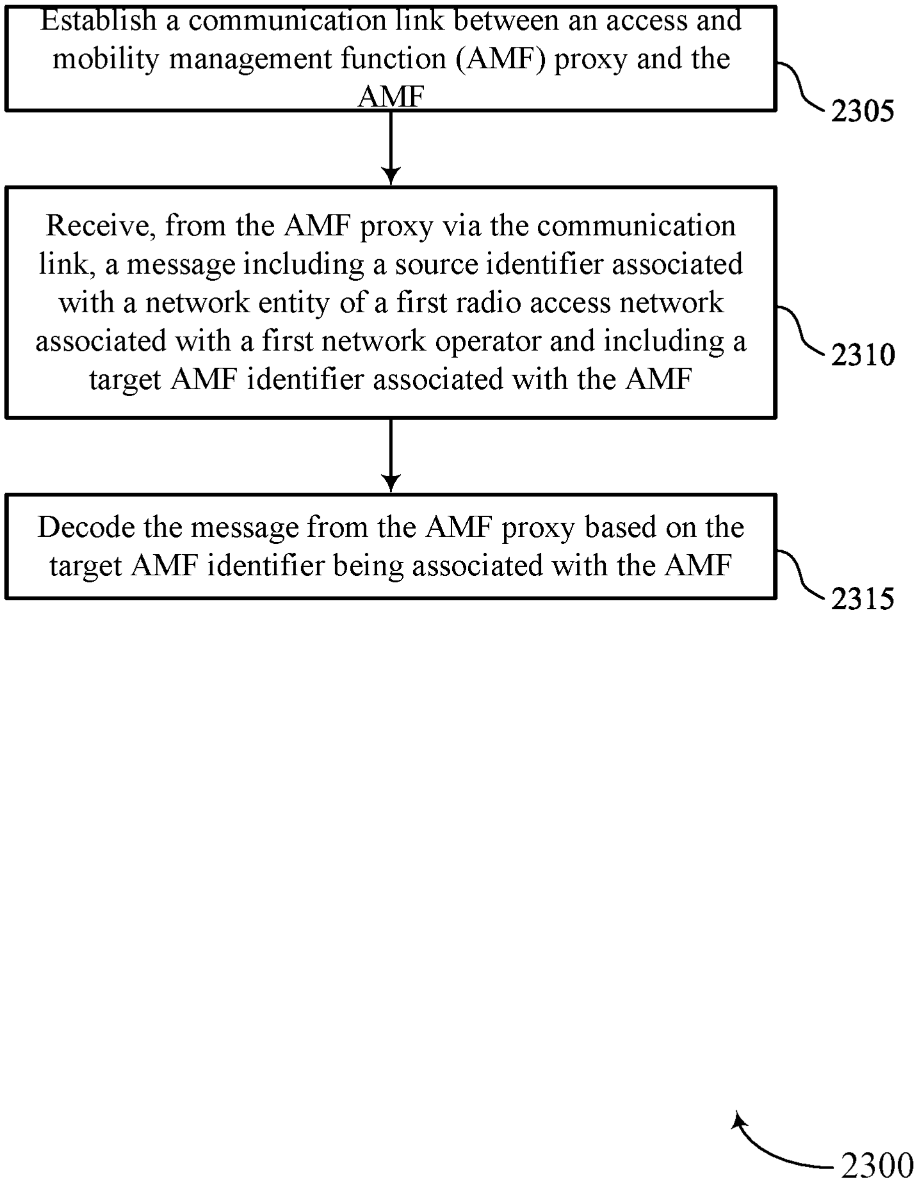

FIG. 23 shows a flowchart illustrating a method 2300 that supports radio access network sharing using a transparent proxy function in accordance with aspects of the present disclosure. The operations of the method 2300 may be implemented by an AMF or its components as described herein. For example, the operations of the method 2300 may be performed by an AMF as described with reference to FIGS. 1 through 5 and 14 through 17. In some examples, an AMF may execute a set of instructions to control the functional elements of the AMF to perform the described functions. Additionally, or alternatively, the AMF may perform aspects of the described functions using special-purpose hardware.

At 2305, the method may include establishing a communication link between an AMF proxy and the AMF. The operations of block 2305 may be performed in accordance with examples as disclosed herein. In some examples, aspects of the operations of 2305 may be performed by an AMF proxy communication link component 1625 as described with reference to FIG. 16.

At 2310, the method may include receiving, from the AMF proxy via the communication link, a message including a source ID associated with a network entity of a first radio access network associated with a first network operator and including a target AMF ID associated with the AMF. The operations of block 2310 may be performed in accordance with examples as disclosed herein. In some examples, aspects of the operations of 2310 may be performed by a message receiver 1630 as described with reference to FIG. 16.

At 2315, the method may include decoding the message from the AMF proxy based on the target AMF ID being associated with the AMF. The operations of block 2315 may be performed in accordance with examples as disclosed herein. In some examples, aspects of the operations of 2315 may be performed by a decoding component 1635 as described with reference to FIG. 16.

Figure 24:
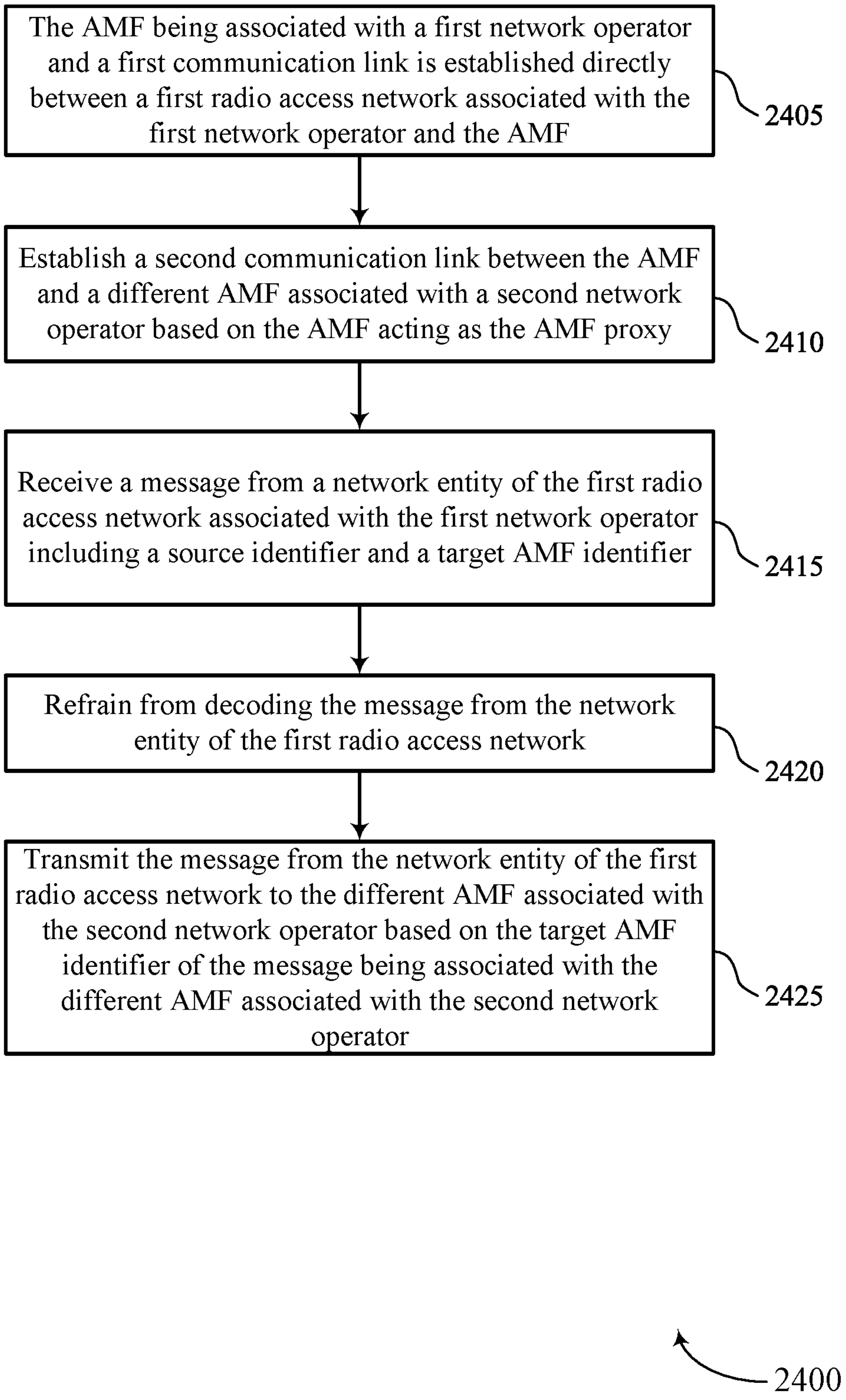

FIG. 24 shows a flowchart illustrating a method 2400 that supports radio access network sharing using a transparent proxy function in accordance with aspects of the present disclosure. The operations of the method 2400 may be implemented by an AMF or its components as described herein. For example, the operations of the method 2400 may be performed by an AMF as described with reference to FIGS. 1 through 5 and 14 through 17. In some examples, an AMF may execute a set of instructions to control the functional elements of the AMF to perform the described functions. Additionally, or alternatively, the AMF may perform aspects of the described functions using special-purpose hardware.

At 2405, the method may include the AMF being associated with a first network operator and a first communication link being established directly between a first RAN associated with the first network operator and the AMF. The operations of block 2405 may be performed in accordance with examples as disclosed herein. In some examples, aspects of the operations of 2405 may be performed by an AMF proxy communication link component 1625 as described with reference to FIG. 16.

At 2410, the method may include establishing a second communication link between the AMF and a different AMF associated with a second network operator based on the AMF acting as the AMF proxy. The operations of block 2410 may be performed in accordance with examples as disclosed herein. In some examples, aspects of the operations of 2410 may be performed by an AMF communication link component 1645 as described with reference to FIG. 16.

At 2415, the method may include receiving a message from a network entity of the first RAN associated with the first network operator including a source ID and a target AMF ID. The operations of block 2415 may be performed in accordance with examples as disclosed herein. In some examples, aspects of the operations of 2415 may be performed by a message receiver 1630 as described with reference to FIG. 16. At 2420, the method may include refraining from decoding the message from the network entity of the first radio access network. The operations of block 2420 may be performed in accordance with examples as disclosed herein. In some examples, aspects of the operations of 2420 may be performed by a decoding component 1635 as described with reference to FIG. 16.

At 2425, the method may include transmitting the message from the network entity of the first radio access network to the different AMF associated with the second network operator based on the target AMF ID of the message being associated with the different AMF associated with the second network operator. The operations of block 2425 may be performed in accordance with examples as disclosed herein. In some examples, aspects of the operations of 2425 may be performed by a message transmitter 1640 as described with reference to FIG. 16.

Aspect 1: A method for wireless communications at an AMF proxy, comprising: establishing a first communication link between the AMF proxy and a first RAN associated with a first network operator, a second communication link between the AMF proxy and a first AMF associated with the first network operator, and a third communication link between the AMF proxy and a second AMF associated with a second network operator; receiving, from the first RAN via the first communication link, a message comprising a source ID associated with a network entity of the first RAN and comprising a target AMF ID; and transmitting the message to the first AMF via the second communication link based at least in part on the target AMF ID corresponding to the first AMF or transmitting the message to the second AMF via the third communication link based at least in part on the target AMF ID corresponding to the second AMF.

Aspect 2: The method of aspect 1, wherein the first communication link is directly established between the first RAN and the first AMF and the method further comprises: establishing the second communication link between the first AMF associated with the first network operator and the second AMF associated with the second network operator, wherein the first AMF acts as the AMF proxy.

Aspect 3: The method of aspect 2, further comprising: transmitting, as part of establishing the first communication link between the first RAN and the first AMF, a second message to the first RAN, the second message indicating support for establishing a communication link with an AMF of a network operator that is different than the first network operator; and establishing the second communication link between the first AMF and the second AMF based at least in part on the first AMF acting as the AMF proxy and on the second message.

Aspect 4: The method of any of aspects 1 through 3, further comprising: establishing a plurality of communication links between the AMF proxy and a plurality of RANs, wherein the plurality of communication links includes the first communication link and the plurality of RANs includes the first RAN.

Aspect 5: The method of aspect 4, further comprising: receiving, from the plurality of RANs via the plurality of communication links between the AMF proxy and the plurality of RANs, a plurality of messages, each message of the plurality of messages including a respective source ID associated with a respective network entity of a respective RAN of the plurality of RANs and a respective target AMF ID associated with one of the first AMF or the second AMF; multiplexing one or more messages that have a same target ID together, the one or more messages being from the plurality of messages, wherein the one or more messages with the same target ID associated with the first AMF are multiplexed together in a first multiplexed message and the one or more messages with the same target ID associated with the second AMF are multiplexed together into a second multiplexed message; and transmitting the first and second multiplexed messages to respective AMFs of the first AMF and the second AMF.

Aspect 6: The method of any of aspects 1 through 5, wherein receiving the message from the first RAN via the first communication link comprises: receiving the message comprising the source ID and the target AMF ID as part of a routing information element in the message.

Aspect 7: The method of aspect 6, wherein the target AMF ID includes a public land mobile network (PLMN) ID.

Aspect 8: The method of any of aspects 6 through 7, further comprising: receiving a first message from the first RAN via the first communication link, the first message comprising the source ID and the target AMF ID, the target AMF ID including a corresponding PLMN ID; storing an index of the target AMF ID and the corresponding PLMN ID and associating the target AMF ID with an index value; transmitting the index value to the first RAN; and receiving a second message from the first RAN via the first communication link, the second message comprising the source ID, the index value for the target AMF ID, and the corresponding PLMN ID.

Aspect 9: The method of any of aspects 1 through 8, further comprising: receiving a second message from the first AMF via the second communication link or from the second AMF via the third communication link, the second message comprising a source AMF ID and a target RAN ID; and transmitting a second message to the first RAN via the first communication link based at least in part on the target RAN ID.

Aspect 10: The method of aspect 9, wherein receiving the second message from the first AMF via second communication link or from the second AMF via the third communication link comprises: receive the second message comprising the source AMF ID and the target RAN ID as part of a routing information element in the second message.

Aspect 11: A method for wireless communications at a first RAN, comprising: establishing a communication link between an AMF proxy and the first RAN associated with a first network operator for communications with a first AMF associated with the first network operator or for communications with a second AMF associated with a second network operator; and transmitting, to the AMF proxy via the communication link, a message comprising a source ID associated with a network entity of the first RAN and comprising a target AMF ID, wherein the message is for the first AMF or the second AMF based at least in part on the target AMF ID.

Aspect 12: The method of aspect 11, wherein the communication link is established directly between the first RAN and the first AMF and the method further comprises: transmitting the message, to the first AMF via the communication link, based at least in part on the first AMF acting as the AMF proxy.

Aspect 13: The method of any of aspects 11 through 12, wherein the first RAN is included in a plurality of RANs and the communication link is included in a plurality of communication links between the plurality of RANs and the AMF proxy.

Aspect 14: The method of any of aspects 11 through 13, wherein transmitting the message to the AMF proxy via the communication link comprises: transmitting the message comprising the source ID and the target AMF ID as part of a routing information element in the message.

Aspect 15: The method of aspect 14, wherein the target AMF ID includes a public land mobile network (PLMN) ID.

Aspect 16: The method of any of aspects 11 through 15, further comprising: transmitting a second message to the AMF proxy via the communication link, the second message comprising the source ID and the target AMF ID including a corresponding PLMN ID; receiving, from the AMF proxy, an index value for the target AMF ID based at least in part on the target AMF ID and the corresponding PLMN ID; and transmitting a third message to the AMF proxy via the communication link, the second message comprising the source ID, the index value for the target AMF ID, and the corresponding PLMN ID.

Aspect 17: The method of any of aspects 11 through 16, further comprising: receiving a second message from the AMF proxy via the communication link, the second message comprising a source AMF ID and a target RAN ID, wherein the source AMF ID is associated with the first AMF or the second AMF and the target RAN ID is associated with the first RAN.

Aspect 18: The method of aspect 17, wherein receiving the second message from the AMF proxy via the communication link comprises: receive the second message comprising the source ID and the target AMF ID as part of a routing information element in the second message.

Aspect 19: A method for wireless communications at an AMF, comprising: establishing a communication link between an AMF proxy and the AMF; receiving, from the AMF proxy via the communication link, a message comprising a source ID associated with a network entity of a first RAN associated with a first network operator and comprising a target AMF ID associated with the AMF; and decoding the message from the AMF proxy based at least in part on the target AMF ID being associated with the AMF.

Aspect 20: The method of aspect 19, wherein the AMF is associated with the first network operator or a second network operator.

Aspect 21: The method of aspect 20, wherein if the AMF is associated with the first network operator and a first communication link is established directly between the first RAN and the AMF, the method further comprising establishing a second communication link between the AMF and a different AMF associated with the second network operator based at least in part on the AMF acting as the AMF proxy; and receiving the message from the network entity of the first RAN associated with the first network operator comprising the source ID and the target AMF ID.

Aspect 22: The method of aspect 21, further comprising: refraining from decoding the message from the network entity of the first RAN; and transmitting the message from the network entity of the first RAN to the different AMF associated with the second network operator based at least in part on the target AMF ID of the message being associated with the different AMF associated with the second network operator.

Aspect 23: The method of any of aspects 19 through 22, further comprising: receiving a multiplexed message from the AMF proxy, wherein the multiplexed message includes one or messages that have a same target AMF ID; and decoding the one or more messages received via the multiplexed message.

Aspect 24: The method of any of aspects 19 through 23, wherein receiving the message from the network entity of the first RAN comprises: receiving the message comprising the source ID and the target AMF ID as part of a routing information element in the message.

Aspect 25: The method of aspect 24, wherein the target AMF ID includes a public land mobile network (PLMN) ID.

Aspect 26: The method of any of aspects 19 through 25, further comprising: transmitting a second message to the AMF proxy via the communication link, the second message comprising the source AMF ID and a target RAN ID, wherein the source AMF ID is associated with the AMF and the target RAN ID is associated with the first RAN.

Aspect 27: The method of aspect 26, wherein transmitting the second message to the first RAN comprises: transmitting the second message comprising the source AMF ID and the target RANID as part of a routing information element in the message.

Aspect 28: An apparatus for wireless communications at an AMF proxy, comprising a processor; memory coupled with the processor; and instructions stored in the memory and executable by the processor to cause the apparatus to perform a method of any of aspects 1 through 10.

Aspect 29: An apparatus for wireless communications at an AMF proxy, comprising at least one means for performing a method of any of aspects 1 through 10.

Aspect 30: A non-transitory computer-readable medium storing code for wireless communications at an AMF proxy, the code comprising instructions executable by a processor to perform a method of any of aspects 1 through 10.

Aspect 31: An apparatus for wireless communications at a first RAN, comprising a processor; memory coupled with the processor; and instructions stored in the memory and executable by the processor to cause the apparatus to perform a method of any of aspects 11 through 18.

Aspect 32: An apparatus for wireless communications at a first RAN, comprising at least one means for performing a method of any of aspects 11 through 18.

Aspect 33: A non-transitory computer-readable medium storing code for wireless communications at a first RAN, the code comprising instructions executable by a processor to perform a method of any of aspects 11 through 18.

Aspect 34: An apparatus for wireless communications at an AMF, comprising a processor; memory coupled with the processor; and instructions stored in the memory and executable by the processor to cause the apparatus to perform a method of any of aspects 19 through 27.

Aspect 35: An apparatus for wireless communications at an AMF, comprising at least one means for performing a method of any of aspects 19 through 27.

Aspect 36: A non-transitory computer-readable medium storing code for wireless communications at an AMF, the code comprising instructions executable by a processor to perform a method of any of aspects 19 through 27

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at an access and mobility management function (AMF) proxy, comprising:

one or more processors;

one or more memories coupled with the one or more processors; and instructions stored in the one or more memories and executable by the one or more processors to cause the apparatus to:

establish a first communication link between the AMF proxy and a first radio access network associated with a first network operator, a second communication link between the AMF proxy and a first AMF associated with the first network operator, and a third communication link between the AMF proxy and a second AMF associated with a second network operator;

receive, from the first radio access network via the first communication link, a message comprising a source identifier associated with a network entity of the first radio access network and comprising a target AMF identifier; and transmit the message to the first AMF via the second communication link based at least in part on the target AMF identifier corresponding to the first AMF or transmitting the message to the second AMF via the third communication link based at least in part on the target AMF identifier corresponding to the second AMF.

2. The apparatus of claim 1, wherein the first communication link is established directly between the first radio access network and the first AMF and the instructions are further executable by the one or more processors to cause the apparatus to:

establish the second communication link between the first AMF associated with the first network operator and the second AMF associated with the second network operator, wherein the first AMF acts as the AMF proxy.

3. The apparatus of claim 2, wherein the instructions are further executable by the one or more processors to cause the apparatus to:

transmit, as part of establishing the first communication link between the first radio access network and the first AMF, a second message to the first radio access network, the second message indicating support for establishing a communication link with an AMF of a network operator that is different than the first network operator; and establish the second communication link between the first AMF and the second AMF based at least in part on the first AMF acting as the AMF proxy and on the second message.

4. The apparatus of claim 1, wherein the instructions are further executable by the one or more processors to cause the apparatus to:

establish a plurality of communication links between the AMF proxy and a plurality of radio access networks, wherein the plurality of communication links includes the first communication link and the plurality of radio access networks includes the first radio access network.

5. The apparatus of claim 4, wherein the instructions are further executable by the one or more processors to cause the apparatus to:

receive, from the plurality of radio access networks via the plurality of communication links between the AMF proxy and the plurality of radio access networks, a plurality of messages, each message of the plurality of messages including a respective source identifier associated with a respective network entity of a respective radio access network of the plurality of radio access networks and a respective target AMF identifier associated with one of the first AMF or the second AMF;

multiplex one or more messages that have a same target identifier together, the one or more messages being from the plurality of messages, wherein the one or more messages with the same target identifier associated with the first AMF are multiplexed together in a first multiplexed message and the one or more messages with the same target identifier associated with the second AMF are multiplexed together into a second multiplexed message; and transmit the first and second multiplexed messages to respective AMFs of the first AMF and the second AMF.

6. The apparatus of claim 1, wherein the instructions to receive the message from the first radio access network via the first communication link are executable by the one or more processors to cause the apparatus to:

receive the message comprising the source identifier and the target AMF identifier as part of a routing information element in the message.

7. The apparatus of claim 6, wherein the target AMF identifier includes a public land mobile network (PLMN) identifier.

8. The apparatus of claim 6, wherein the instructions are further executable by the one or more processors to cause the apparatus to:

receive a first message from the first radio access network via the first communication link, the first message comprising the source identifier and the target AMF identifier, the target AMF identifier including a corresponding PLMN identifier;

store an index of the target AMF identifier and the corresponding PLMN identifier and associating the target AMF identifier with an index value;

transmit the index value to the first radio access network; and receive a second message from the first radio access network via the first communication link, the second message comprising the source identifier, the index value for the target AMF identifier, and the corresponding PLMN identifier.

9. The apparatus of claim 1, wherein the instructions are further executable by the one or more processors to cause the apparatus to:

receive a second message from the first AMF via the second communication link or from the second AMF via the third communication link, the second message comprising a source AMF identifier and a target radio access network identifier; and transmit the second message to the first radio access network via the first communication link based at least in part on the target radio access network identifier.

10. The apparatus of claim 9, wherein the instructions to receive the second message from the first AMF via the second communication link or from the second AMF via the third communication link are executable by the one or more processors to cause the apparatus to:

receive the second message comprising the source AMF identifier and the target radio access network identifier as part of a routing information element in the second message.

11. An apparatus for wireless communications at a first radio access network, comprising:

one or more processors;

one or more memories coupled with the one or more processors; and instructions stored in the one or more memories and executable by the one or more processors to cause the apparatus to:

establish a communication link between an access and mobility management function (AMF) proxy and the first radio access network associated with a first network operator for communications with a first AMF associated with the first network operator or for communications with a second AMF associated with a second network operator; and transmit, to the AMF proxy via the communication link, a message comprising a source identifier associated with a network entity of the first radio access network and comprising a target AMF identifier, wherein the message is for the first AMF or the second AMF based at least in part on the target AMF identifier.

12. The apparatus of claim 11, wherein the communication link is established directly between the first radio access network and the first AMF and the instructions are further executable by the one or more processors to cause the apparatus to:

transmit the message, to the first AMF via the communication link, based at least in part on the first AMF acts as the AMF proxy.

13. The apparatus of claim 11, wherein the first radio access network is included in a plurality of radio access networks and the communication link is included in a plurality of communication links between the plurality of radio access networks and the AMF proxy.

14. The apparatus of claim 11, wherein the instructions to transmit the message to the AMF proxy via the communication link are executable by the one or more processors to cause the apparatus to:

transmit the message comprising the source identifier and the target AMF identifier as part of a routing information element in the message.

15. The apparatus of claim 14, wherein the target AMF identifier includes a public land mobile network (PLMN) identifier.

16. The apparatus of claim 11, wherein the instructions are further executable by the one or more processors to cause the apparatus to:

transmit a second message to the AMF proxy via the communication link, the second message comprising the source identifier and the target AMF identifier including a corresponding PLMN identifier;

receive, from the AMF proxy, an index value for the target AMF identifier based at least in part on the target AMF identifier and the corresponding PLMN identifier; and transmit a third message to the AMF proxy via the communication link, the second message comprising the source identifier, the index value for the target AMF identifier, and the corresponding PLMN identifier.

17. The apparatus of claim 11, wherein the instructions are further executable by the one or more processors to cause the apparatus to:

receive a second message from the AMF proxy via the communication link, the second message comprising a source AMF identifier and a target radio access network identifier, wherein the source AMF identifier is associated with the first AMF or the second AMF and the target radio access network identifier is associated with the first radio access network.

18. The apparatus of claim 17, wherein the instructions to receive the second message from the AMF proxy via the communication link are executable by the one or more processors to cause the apparatus to:

receive the second message comprising the source AMF identifier and the target radio access network identifier as part of a routing information element in the second message.

19. A method for wireless communications at an access and mobility management function (AMF) proxy, comprising:

establishing a first communication link between the AMF proxy and a first radio access network associated with a first network operator, a second communication link between the AMF proxy and a first AMF associated with the first network operator, and a third communication link between the AMF proxy and a second AMF associated with a second network operator;

receiving, from the first radio access network via the first communication link, a message comprising a source identifier associated with a network entity of the first radio access network and comprising a target AMF identifier; and transmitting the message to the first AMF via the second communication link based at least in part on the target AMF identifier corresponding to the first AMF or transmitting the message to the second AMF via the third communication link based at least in part on the target AMF identifier corresponding to the second AMF.

20. The method of claim 19, wherein the first communication link is directly established between the first radio access network and the first AMF and the method further comprises:

establishing the second communication link between the first AMF associated with the first network operator and the second AMF associated with the second network operator, wherein the first AMF acts as the AMF proxy.

21. The method of claim 19, wherein receiving the message comprises:

receiving a second message from the first AMF via the second communication link or from the second AMF via the third communication link, the second message comprising a source AMF identifier and a target radio access network identifier; and transmitting the second message to the first radio access network via the first communication link based at least in part on the target radio access network identifier.

22. The method of claim 19, further comprising:

transmitting, as part of establishing the first communication link between the first radio access network and the first AMF, a second message to the first radio access network, the second message indicating support for establishing a communication link with an AMF of a network operator that is different than the first network operator; and establishing the second communication link between the first AMF and the second AMF based at least in part on the first AMF acting as the AMF proxy and on the second message.

23. The method of claim 19, further comprising:

establishing a plurality of communication links between the AMF proxy and a plurality of radio access networks, wherein the plurality of communication links includes the first communication link and the plurality of radio access networks includes the first radio access network.

24. The method of claim 23, further comprising:

receiving, from the plurality of radio access networks via the plurality of communication links between the AMF proxy and the plurality of radio access networks, a plurality of messages, each message of the plurality of messages including a respective source identifier associated with a respective network entity of a respective radio access network of the plurality of radio access networks and a respective target AMF identifier associated with one of the first AMF or the second AMF;

multiplexing one or more messages that have a same target identifier together, the one or more messages being from the plurality of messages, wherein the one or more messages with the same target identifier associated with the first AMF are multiplexed together in a first multiplexed message and the one or more messages with the same target identifier associated with the second AMF are multiplexed together into a second multiplexed message; and transmitting the first and second multiplexed messages to respective AMFs of the first AMF and the second AMF.

25. The method of claim 19, further comprising:

receiving the message comprising the source identifier and the target AMF identifier as part of a routing information element in the message.

26. The method of claim 19, wherein the target AMF identifier includes a public land mobile network (PLMN) identifier, the method further comprising:

receiving a first message from the first radio access network via the first communication link, the first message comprising the source identifier and the target AMF identifier, the target AMF identifier including a corresponding PLMN identifier;

storing an index of the target AMF identifier and the corresponding PLMN identifier and associating the target AMF identifier with an index value;

transmitting the index value to the first radio access network; and receiving a second message from the first radio access network via the first communication link, the second message comprising the source identifier, the index value for the target AMF identifier, and the corresponding PLMN identifier.

27. A method for wireless communications at a first radio access network, comprising:

establishing a communication link between an access and mobility management function (AMF) proxy and the first radio access network associated with a first network operator for communications with a first AMF associated with the first network operator or for communications with a second AMF associated with a second network operator; and transmitting, to the AMF proxy via the communication link, a message comprising a source identifier associated with a network entity of the first radio access network and comprising a target AMF identifier, wherein the message is for the first AMF or the second AMF based at least in part on the target AMF identifier.

28. The method of claim 27, wherein the communication link is established directly between the first radio access network and the first AMF, the method further comprising:

transmitting the message, to the first AMF via the communication link, based at least in part on the first AMF acts as the AMF proxy.

29. The method of claim 27, wherein the first radio access network is included in a plurality of radio access networks and the communication link is included in a plurality of communication links between the plurality of radio access networks and the AMF proxy.

30. The method of claim 27, further comprising:

transmitting the message comprising the source identifier and the target AMF identifier as part of a routing information element in the message.

* * * * *